(12) United States Patent
Maeda et al.

(10) Patent No.: US 9,755,854 B2
(45) Date of Patent: Sep. 5, 2017

(54) TAG CONVERSION APPARATUS

(71) Applicant: Hitachi Metals, Ltd., Tokyo (JP)

(72) Inventors: Kazuhiro Maeda, Tokyo (JP); Osamu Takada, Tokyo (JP); Jyunji Kinoshita, Tokyo (JP); Shingo Sugawara, Tokyo (JP); Toshihiko Murakami, Tokyo (JP); Hitoshi Kuwata, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 107 days.

(21) Appl. No.: 14/944,498

(22) Filed: Nov. 18, 2015

(65) Prior Publication Data

US 2016/0173417 A1    Jun. 16, 2016

(30) Foreign Application Priority Data

Dec. 12, 2014    (JP) ................. 2014-251833

(51) Int. Cl.
*H04L 12/46* (2006.01)
*G06F 9/455* (2006.01)

(52) U.S. Cl.
CPC ...... *H04L 12/4645* (2013.01); *G06F 9/45533* (2013.01); *G06F 9/45558* (2013.01); *H04L 12/465* (2013.01); *H04L 12/4633* (2013.01); *G06F 2009/45595* (2013.01)

(58) Field of Classification Search
CPC ............ H04L 12/4645; H04L 12/4633; H04L 12/465; G06F 9/45533; G06F 9/45558; G06F 2009/45595
See application file for complete search history.

(56) References Cited

U.S. PATENT DOCUMENTS

| | | | |
|---|---|---|---|
| 8,223,770 B2 | 7/2012 | Wray et al. | |
| 2004/0081180 A1* | 4/2004 | De Silva | H04L 47/2491 370/402 |
| 2004/0202171 A1* | 10/2004 | Hama | H04L 12/4641 370/395.1 |
| 2007/0171918 A1* | 7/2007 | Ota | H04L 12/2856 370/395.53 |

* cited by examiner

*Primary Examiner* — Duc C Ho
(74) *Attorney, Agent, or Firm* — Mattingly & Malur, PC

(57) ABSTRACT

A controller of a tag conversion apparatus configured holds tag conversion information associating addresses of communication apparatuses and information on tags of tagging schemes for network separation, analyzes a frame input from one of the plurality of ports and determine a current tagging scheme of the frame, determines a tagging scheme associated with a destination address of the frame based on the tag conversion information, and converts the frame to a frame of the tagging scheme associated with the destination address based on the tag conversion information when the tagging scheme associated with the destination address and the current tagging scheme are different.

14 Claims, 18 Drawing Sheets

| CUSTOMER ID | NET GROUP ID | INSTALLATION DOMAIN | TAGGING SCHEME | VM ID | MAC ADDRESS | IP ADDRESS |
|---|---|---|---|---|---|---|
| CUSTOMER A | 1 | DOMAIN A | TAGGING SCHEME A | A1 | 00:00:00:FF:00:A1 | 192.168.10.11 |
| | | DOMAIN A | TAGGING SCHEME A | A2 | 00:00:00:FF:00:A2 | 192.168.10.11 |
| | | DOMAIN B | TAGGING SCHEME B | B1 | 00:00:00:FF:00:B1 | 192.168.10.22 |
| | | DOMAIN C | TAGGING SCHEME A+B | C1 | 00:00:00:FF:00:C1 | 192.168.10.33 |
| | 2 | DOMAIN A | TAGGING SCHEME A | A3 | 00:00:00:FF:00:A3 | 192.168.10.11 |
| | | DOMAIN B | TAGGING SCHEME B | B2 | 00:00:00:FF:00:B2 | 192.168.10.22 |
| | | DOMAIN B | TAGGING SCHEME B | B3 | 00:00:00:FF:00:B3 | 192.168.10.22 |
| | | DOMAIN C | TAGGING SCHEME A+B | C2 | 00:00:00:FF:00:C2 | 192.168.10.33 |
| | 3 | DOMAIN A | TAGGING SCHEME A | A4 | 00:00:00:FF:00:A4 | 192.168.10.14 |
| | | DOMAIN B | TAGGING SCHEME B | B4 | 00:00:00:FF:00:B4 | 192.168.10.22 |
| | | DOMAIN C | TAGGING SCHEME A+B | C3 | 00:00:00:FF:00:C3 | 192.168.10.33 |
| | | DOMAIN C | TAGGING SCHEME A+B | C4 | 00:00:00:FF:00:C4 | 192.168.10.33 |
| CUSTOMER B | 4 | DOMAIN A | TAGGING SCHEME A | A5 | 00:00:00:FF:00:A5 | 192.168.10.15 |
| | | DOMAIN B | TAGGING SCHEME B | B5 | 00:00:00:FF:00:B5 | 192.168.10.22 |
| | | DOMAIN C | TAGGING SCHEME A+B | C5 | 00:00:00:FF:00:C5 | 192.168.10.33 |
| : | : | : | : | : | : | : |

CUSTOMER MANAGEMENT TABLE 40

FIG. 5

| VM ID | MAC ADDRESS | TAG A IDENTIFIER (VNI) | TAG B IDENTIFIER (VID) | IP ADDRESS |
|---|---|---|---|---|
| C1 | 00:00:00:FF:00:C1 | 100 | 1 | 192.168.10.33 |
| C2 | 00:00:00:FF:00:C2 | 100 | 2 | 192.168.10.33 |
| C3 | 00:00:00:FF:00:C3 | 100 | 3 | 192.168.10.33 |
| C4 | 00:00:00:FF:00:C4 | 100 | 3 | 192.168.10.33 |
| C5 | 00:00:00:FF:00:C5 | 200 | 4 | 192.168.10.33 |
| : | : | : | : | : |

541 542 543 544 545

DOMAIN C MANAGEMENT TABLE 54

*FIG. 6C*

| TAG CONVERSION TABLE 80 ||||||||||
|---|---|---|---|---|---|---|---|---|
| CUSTOMER INFORMATION |||||||| TAG INFORMATION ||
| CUSTOMER ID | NET GROUP ID | INSTALLATION DOMAIN | TAGGING SCHEME | VM ID | MAC ADDRESS | IP ADDRESS | TAG B IDENTIFIER (VID) | TAG A IDENTIFIER (VNI) |
| CUSTOMER A | 1 | DOMAIN A | TAGGING SCHEME A | A1 | 00:00:00:FF:00:A1 | 192.168.10.11 | — | 1 |
| | | DOMAIN A | TAGGING SCHEME A | A2 | 00:00:00:FF:00:A2 | 192.168.10.11 | — | |
| | | DOMAIN B | TAGGING SCHEME B | B1 | 00:00:00:FF:00:B1 | 192.168.10.22 | 10 | — |
| | | DOMAIN C | TAGGING SCHEME A+B | C1 | 00:00:00:FF:00:C1 | 192.168.10.33 | 1 | 100 |
| | 2 | DOMAIN A | TAGGING SCHEME A | A3 | 00:00:00:FF:00:A3 | 192.168.10.11 | — | 2 |
| | | DOMAIN B | TAGGING SCHEME B | B2 | 00:00:00:FF:00:B2 | 192.168.10.22 | 20 | — |
| | | DOMAIN B | TAGGING SCHEME B | B3 | 00:00:00:FF:00:B3 | 192.168.10.22 | | — |
| | | DOMAIN C | TAGGING SCHEME A+B | C2 | 00:00:00:FF:00:C2 | 192.168.10.33 | 2 | 100 |
| | 3 | DOMAIN A | TAGGING SCHEME A | A4 | 00:00:00:FF:00:A4 | 192.168.10.14 | — | 3 |
| | | DOMAIN B | TAGGING SCHEME B | B4 | 00:00:00:FF:00:B4 | 192.168.10.22 | 30 | — |
| | | DOMAIN C | TAGGING SCHEME A+B | C3 | 00:00:00:FF:00:C3 | 192.168.10.33 | 3 | 100 |
| | | DOMAIN C | TAGGING SCHEME A+B | C4 | 00:00:00:FF:00:C4 | 192.168.10.33 | | |
| CUSTOMER B | 4 | DOMAIN A | TAGGING SCHEME A | A5 | 00:00:00:FF:00:A5 | 192.168.10.15 | — | 4 |
| | | DOMAIN B | TAGGING SCHEME B | B5 | 00:00:00:FF:00:B5 | 192.168.10.22 | 40 | — |
| | | DOMAIN C | TAGGING SCHEME A+B | C5 | 00:00:00:FF:00:C5 | 192.168.10.33 | 4 | 200 |
| ⋮ | ⋮ | ⋮ | ⋮ | ⋮ | ⋮ | ⋮ | ⋮ | ⋮ |
| 801 | 802 | 803 | 804 | 805 | 806 | 807 | 808 | 809 |

*FIG. 8*

| CUSTOMER ID | NET GROUP ID | INSTALLATION DOMAIN | TAGGING SCHEME | VM ID | MAC ADDRESS | IP ADDRESS |
|---|---|---|---|---|---|---|
| 41 | 42 | 43 | 44 | 45 | 46 | 47 |
| CUSTOMER A | 1 | DOMAIN A1 | TAGGING SCHEME A | A11 | 00:00:00:FF:A1:01 | 192.168.10.11 |
| | | | | A12 | 00:00:00:FF:A1:02 | 192.168.10.11 |
| | | DOMAIN B1 | TAGGING SCHEME B | B11 | 00:00:00:FF:B1:01 | 192.168.10.21 |
| | | DOMAIN A2 | TAGGING SCHEME A | A21 | 00:00:00:FF:A2:01 | 192.168.10.12 |
| | | DOMAIN B2 | TAGGING SCHEME B | B21 | 00:00:00:FF:B2:01 | 192.168.10.22 |
| | 2 | DOMAIN A1 | TAGGING SCHEME A | A13 | 00:00:00:FF:A1:03 | 192.168.10.11 |
| | | DOMAIN B1 | TAGGING SCHEME B | B12 | 00:00:00:FF:B1:02 | 192.168.10.21 |
| | | | | B13 | 00:00:00:FF:B1:03 | 192.168.10.21 |
| | | DOMAIN A2 | TAGGING SCHEME A | A22 | 00:00:00:FF:A2:02 | 192.168.10.12 |
| | | DOMAIN B2 | TAGGING SCHEME B | B22 | 00:00:00:FF:B2:02 | 192.168.10.22 |
| | | | | B23 | 00:00:00:FF:B2:03 | 192.168.10.22 |
| | 3 | DOMAIN A1 | TAGGING SCHEME A | A14 | 00:00:00:FF:A1:04 | 192.168.10.11 |
| | | DOMAIN B1 | TAGGING SCHEME B | B14 | 00:00:00:FF:B1:04 | 192.168.10.21 |
| | | DOMAIN A2 | TAGGING SCHEME A | A23 | 00:00:00:FF:A2:03 | 192.168.10.12 |
| | | | | A24 | 00:00:00:FF:A2:04 | 192.168.10.12 |
| | | DOMAIN B2 | TAGGING SCHEME B | B24 | 00:00:00:FF:B2:04 | 192.168.10.22 |
| CUSTOMER B | 4 | DOMAIN A1 | TAGGING SCHEME A | A15 | 00:00:00:FF:A1:05 | 192.168.10.11 |
| | | DOMAIN B1 | TAGGING SCHEME B | B15 | 00:00:00:FF:B1:05 | 192.168.10.21 |
| | | DOMAIN A2 | TAGGING SCHEME A | A25 | 00:00:00:FF:A2:05 | 192.168.10.12 |
| | | DOMAIN B2 | TAGGING SCHEME B | B25 | 00:00:00:FF:B2:05 | 192.168.10.22 |
| ⋮ | ⋮ | ⋮ | ⋮ | ⋮ | ⋮ | ⋮ |
| CUSTOMER MANAGEMENT TABLE 40 | | | | | | |

*FIG. 13*

| VMID | MAC ADDRESS | TAG A IDENTIFIER (VNI) | IP ADDRESS |
|---|---|---|---|
| A11 | 00:00:00:FF:A1:01 | 100 | 192.168.10.11 |
| A12 | 00:00:00:FF:A1:02 | | 192.168.10.11 |
| A13 | 00:00:00:FF:A1:03 | 200 | 192.168.10.11 |
| A14 | 00:00:00:FF:A1:04 | 300 | 192.168.10.11 |
| A15 | 00:00:00:FF:A1:05 | 400 | 192.168.10.11 |
| : | : | : | : |

311, 312, 313, 314

DOMAIN A1 MANAGEMENT TABLE 131

*FIG. 14A*

| VMID | MAC ADDRESS | TAG B IDENTIFIER (VID) |
|---|---|---|
| B11 | 00:00:00:FF:B1:01 | 10 |
| B12 | 00:00:00:FF:B1:02 | 20 |
| B13 | 00:00:00:FF:B1:03 | |
| B14 | 00:00:00:FF:B1:04 | 30 |
| B15 | 00:00:00:FF:B1:05 | 40 |
| : | : | : |

321, 322, 323

DOMAIN B1 MANAGEMENT TABLE 132

*FIG. 14B*

| VMID | MAC ADDRESS | TAG A IDENTIFIER (VNI) | IP ADDRESS |
|---|---|---|---|
| A21 | 00:00:00: FF:A2:01 | 101 | 192.168.10.12 |
| A22 | 00:00:00: FF:A2:02 | 201 | 192.168.10.12 |
| A23 | 00:00:00: FF:A2:03 | 301 | 192.168.10.12 |
| A24 | 00:00:00: FF:A2:04 | | 192.168.10.12 |
| A25 | 00:00:00: FF:A2:05 | 401 | 192.168.10.12 |
| : | : | : | : |
| DOMAIN A2 MANAGEMENT TABLE 133 | | | |

*FIG. 14C*

| VMID | MAC ADDRESS | TAG B IDENTIFIER (VID) |
|---|---|---|
| B21 | 00:00:00: FF:B2:01 | 11 |
| B22 | 00:00:00: FF:B2:02 | 21 |
| B23 | 00:00:00: FF:B2:03 | |
| B24 | 00:00:00: FF:B2:04 | 31 |
| B25 | 00:00:00: FF:B2:05 | 41 |
| : | : | : |
| DOMAIN B2 MANAGEMENT TABLE 134 | | |

*FIG. 14D*

|  | DOMAIN A1 | DOMAIN B1 | DOMAIN A2 | DOMAIN B2 |
|---|---|---|---|---|
| DOMAIN A1 | — | Same | Different | Different |
| DOMAIN B1 | Same | — | Different | Different |
| DOMAIN A2 | Different | Different | — | Same |
| DOMAIN B2 | Different | Different | Same | — |
| DOMAIN CONNECTION RELATION TABLE | | | | 140 |

FIG. 15

| TAG CONVERSION TABLE | | | | | | | | | | 80 |
|---|---|---|---|---|---|---|---|---|---|---|
| CUSTOMER INFORMATION | | | | | | | TAG INFORMATION | | | |
| CUSTO-MER ID | NET GROUP ID | INSTAL-LATION DOMAIN | TAGGING SCHEME | VM ID | MAC AD-DRESS | IP AD-DRESS | TAG B IDENTI-FIER (VID) | TAG A IDENTI-FIER (VNI) | RELAY TAG B IDENTI-FIER (VID) | RELAY TAG A IDENTI-FIER (VNI) |
| CUSTO-MER A | 1 | DOMAIN A1 | TAGGING SCHEME A | A11 | | | — | 100 | 2 | 1000 |
| | | | | A12 | | | | | | |
| | | DOMAIN B1 | TAGGING SCHEME B | B11 | | | 10 | — | | |
| | | DOMAIN A2 | TAGGING SCHEME A | A21 | | | — | 101 | | |
| | | DOMAIN B2 | TAGGING SCHEME B | B21 | | | 11 | — | | |
| | 2 | DOMAIN A1 | TAGGING SCHEME A | A13 | | | — | 200 | 3 | |
| | | DOMAIN B1 | TAGGING SCHEME B | B12 | | | 20 | — | | |
| | | | | B13 | | | | | | |
| | | DOMAIN A2 | TAGGING SCHEME A | A22 | | | — | 201 | | |
| | | DOMAIN B2 | TAGGING SCHEME B | B22 | | | 21 | — | | |
| | | | | B23 | | | | | | |
| | 3 | DOMAIN A1 | TAGGING SCHEME A | A14 | | | — | 300 | 4 | |
| | | DOMAIN B1 | TAGGING SCHEME B | B14 | | | 30 | — | | |
| | | DOMAIN A2 | TAGGING SCHEME A | A23 | | | — | 301 | | |
| | | | | A24 | | | | | | |
| | | DOMAIN B2 | TAGGING SCHEME B | B24 | | | 31 | — | | |
| CUSTO-MER B | 4 | DOMAIN A1 | TAGGING SCHEME A | A15 | | | — | 400 | 2 | 2000 |
| | | DOMAIN B1 | TAGGING SCHEME B | B15 | | | 40 | — | | |
| | | DOMAIN A2 | TAGGING SCHEME A | A25 | | | — | 401 | | |
| | | DOMAIN B2 | TAGGING SCHEME B | B25 | | | 41 | — | | |
| ⋮ | ⋮ | ⋮ | ⋮ | ⋮ | ⋮ | ⋮ | ⋮ | ⋮ | ⋮ | ⋮ |
| 801 | 802 | 803 | 804 | 805 | 806 | 807 | 808 | 809 | 901 | 902 |

FIG. 16

TAG CONVERSION APPARATUS

CLAIM OF PRIORITY

The present application claims priority from Japanese patent application JP2014-251833 filed on Dec. 12, 2014, the content of which is hereby incorporated by reference into this application.

BACKGROUND

The present invention pertains to a tag conversion apparatus.

In constructing a network such as a datacenter and the like, IEEE802.1Q (VLAN (Virtual Local Area Network) tagging) has been used for separating networks virtually for customers. However, in recent years, the required number of separable networks has been increasing and it has become a problem that the separable number of 4094 by VLAN tagging is insufficient.

Thus, double VLAN tagging is standardized in IEEE802.1ad. Double VLAN tagging employs the double tag configuration using two types of VLAN tags. One type of VLAN tag is called C-tag (Customer tag) and the other type of VLAN tag is called S-tag (Service tag).

For example, C-tags are used for a datacenter business operator to separate networks and S-tags are used for a communication carrier connecting datacenters to separate the datacenter business operators. Double VLAN tagging allows a datacenter business operator to separate networks of the datacenter and, simultaneously, for a communication carrier to separate datacenter business operators. Double VLAN tagging is capable of separate approximately 160,000 (4094*4094) networks as a whole.

Further, VXLAN (Virtual eXtensible Local Area Network) tagging is proposed. VXLAN tagging encapsulates a customer frame using VXLAN tag to increase the maximum number of separable networks.

A VXLAN tag mainly consists of a UDP/IP header and a network separation identifier (24 bits) capable of separating approximately 160,000 networks. Compared with IEEE802.ad, VXLAN tagging has a single tag configuration. A customer frame encapsulated with a VXLAN tag may further contains a VLAN tag. This frame configuration is a double tag configuration with a VXLAN tag and a VLAN tag.

Further, U.S. Pat. No. 8,223,770B2 discloses the following network configuration (see abstract). "A virtual network has virtual machines on physical devices connected to network interfaces each coupled by tunnels through a forwarding network, each interface having a forwarding address in an address space of the forwarding network, each network interface having a reconfigurable address mapper for determining a forwarding address for a packet, and encapsulating the packet with its forwarding address so that the forwarding network can deliver the data packet to the remote physical device having that forwarding address."

SUMMARY

In a datacenter, various kinds of devices are operating. Thus, there is a case where different network separation schemes are applied to communication devices, such as VLAN tagging, VXLAN tagging and the combination of VXLAN tagging and VLAN tagging. However, the above background art does not support communications between different tagging schemes, for example, between a single tagging scheme and a double tagging scheme or between different single tagging schemes. Thus, flexible network construction is difficult.

A representative example of the present invention is a tag conversion apparatus including a plurality of ports for communications via networks and a controller. The controller is configured to hold tag conversion information associating addresses of communication apparatuses and information on tags of tagging schemes for network separation. The controller is configured to analyze a frame input from one of the plurality of ports and determine a current tagging scheme of the frame. The controller is configured to determine a tagging scheme associated with a destination address of the frame based on the tag conversion information. The controller is configured to convert the frame to a frame of the tagging scheme associated with the destination address based on the tag conversion information when the tagging scheme associated with the destination address and the current tagging scheme are different. The controller is configured to output the converted frame from one of the plurality of ports.

An aspect of the present invention achieves flexible network construction. Objects, configurations, and effects of this invention other than those described above will be clarified in the description of the following embodiments.

BRIEF DESCRIPTION OF DRAWINGS

FIG. 5 depicts a configuration example of a customer management table for managing information on net groups and deployed virtual machines;

FIG. 6C depicts a configuration example of a domain C management table for a domain C;

FIG. 8 depicts a configuration example of the tag conversion table;

FIG. 13 depicts a configuration example of the customer management table according to Embodiment 2;

FIG. 14A depicts a configuration example of a domain A1 management table for a domain A1;

FIG. 14B depicts a configuration example of a domain B1 management table for a domain B1;

FIG. 14C depicts a configuration example of a domain A2 management table for a domain A2;

FIG. 14D depicts a configuration example of a domain B2 management table for a domain B2;

FIG. 15 depicts a configuration example of a domain connection relation table added in Embodiment 2; and FIG. 16 depicts a configuration example of the tag conversion table according to Embodiment 2.

DETAILED DESCRIPTION OF EMBODIMENTS

Figure 1:
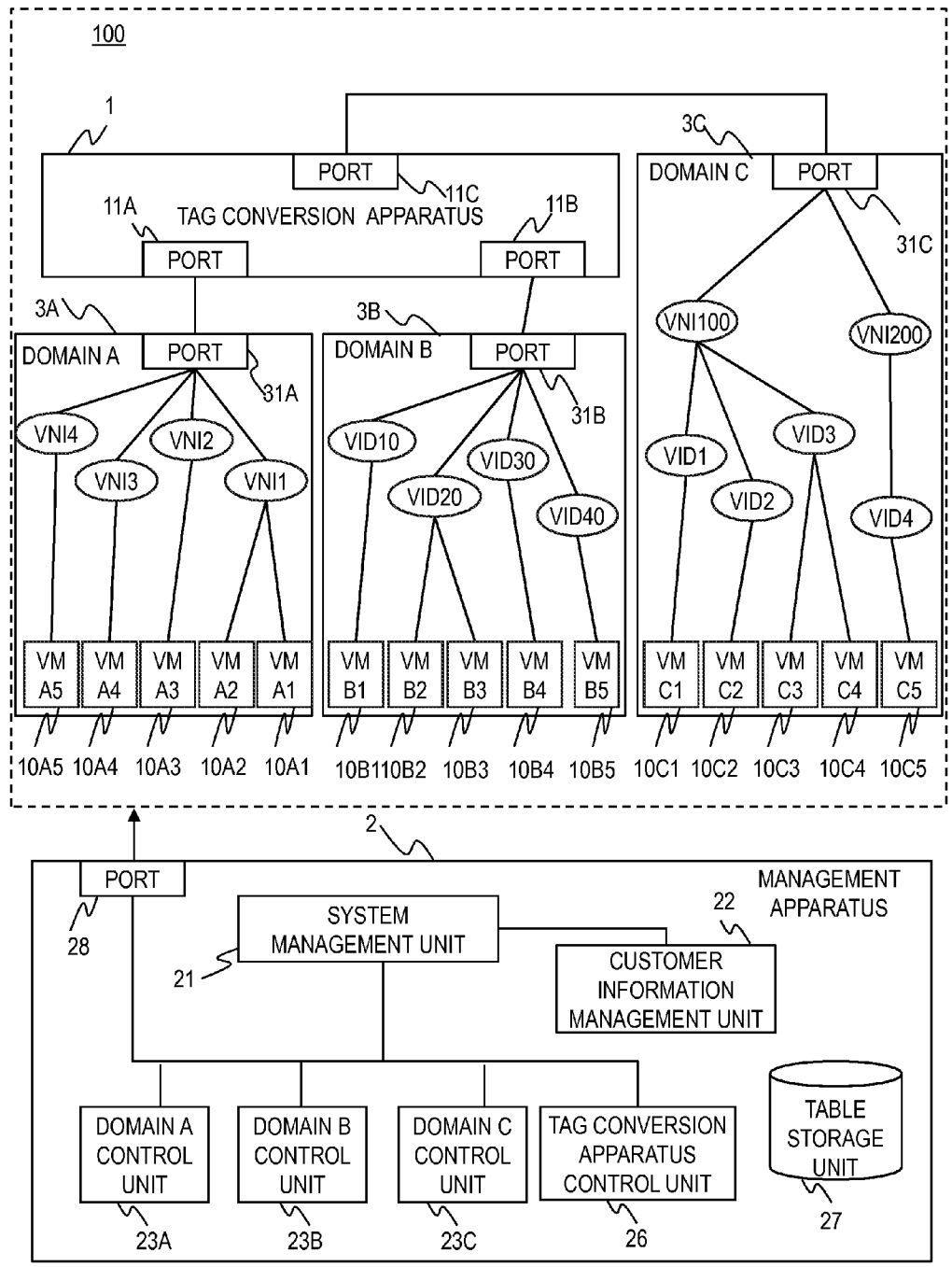
FIG. 1 schematically depicts a configuration example of a system including a network system and a management apparatus for managing the network system according to Embodiment 1.

Hereinafter, embodiments of this invention are described with reference to the accompanying drawings. It should be noted that the embodiments are merely examples to realize this invention and are not to limit the technical scope of this invention. Throughout the drawings, elements common to some drawings are denoted by the same reference signs unless particularly mentioned.

The present embodiments disclose frame transfer techniques between networks employing different virtual network separation schemes. The virtual network separation scheme separates networks virtually by adding tags with different identifiers to frames. As examples of network separation scheme by tag, VLAN tagging, VLAN double tagging and VXLAN tagging are known.

For example, various kinds of devices are operating in a datacenter, and there is a case where available network separation schemes are different for devices. When it is impossible for communication devices of different network separation schemes to communicate with each other, the flexible network construction is difficult. In the configuration to restrict the band of each separate network using a counter installed for each separated network to measure the communication traffic or the discard amount, it is required to prepare a lot of resources appropriate to the number of separated networks.

An embodiment provides a tag conversion apparatus configured to determine the tagging scheme of a received frame and convert the frame structure of the determined tagging scheme to the frame structure of another tagging scheme. The tag conversion apparatus retains tag conversion information associating addresses of communication apparatuses and tag identifiers of specific tagging schemes. The tag conversion apparatus refers to the tag conversion information for a received frame and converts it to the frame structure of the tagging scheme in accordance with the destination address of the frame. The conversion of the frame structure between different tagging schemes using the tag conversion table allows forming a flexible net group including communication apparatuses of different tagging schemes.

The tag conversion apparatus performs tagging scheme conversion between a communication apparatus of a single tagging scheme and communication apparatus of a multiple tagging scheme. The tag conversion apparatus converts frames with different tag identifiers of the single tagging scheme to frames with a common tag identifier of the multiple tagging scheme. Collecting the statistical information on frames and performing the band control with reference to the common tag identifier result in a reduction in the necessary resources for the collection of the statistical information and the band control.

Embodiment 1

An example of operation management of networks and servers in a datacenter is described. The present embodiment performs virtual network separation for forming a group including communication apparatuses and permitting communications only within the formed group. A group of communication apparatuses capable of communicating with one another is called a net group.

A net group includes a plurality of communication apparatuses and each of the communication apparatuses is a virtual communication apparatus or a physical communication apparatus. A virtual machine (VM) can be established on a physical server. In an example explained bellow, each net group consists of a plurality of virtual machines. Different tagging schemes may be applied to virtual machines in a net group. A datacenter business operator lends virtual machines and networks to users (also called customers) of the datacenter.

FIG. 1 schematically depicts a configuration example of a system including a network system 100 and a management apparatus 2 for managing the network system 100 according the present embodiment. The network system 100 includes a tag conversion apparatus 1, a domain A (3A), a domain B (3B) and a domain C (3C). A domain includes one or more communication apparatuses and a common tagging scheme is applied to all the communication apparatuses in a domain. Each communication apparatus is a physical communication apparatus or a virtual communication apparatus.

The tag conversion apparatus 1 is connected with the domain A (3A), the domain B (3B) and the domain C (3C). The tag conversion apparatus 1 is a switch to transfer frames between domains. In the exampled illustrated in FIG. 1, the tag conversion apparatus 1 and the domain A (3A) transmit and receive frames via a port 11A and a port 31A. The tag conversion apparatus 1 and the domain B (3B) transmit and receive frames via a port 11B and a port 31B. The tag conversion apparatus 1 and the domain C (3C) transmit and receive frames via a port 11C and a port 31C.

The domain A (3A) communicates using a tagging scheme A for the network separation. The domain B (3B) communicates using a tagging scheme B for the network separation. The domain C (3C) communicates using the tagging scheme A and the tagging scheme B (the tagging scheme A+B) for the network separation.

The tag conversion apparatus 1 performs the tag conversion of frames so as to allow communications between the tagging scheme A, the tagging scheme B and the tagging scheme A+B. A tagging scheme used in a domain is not restricted. For example, the tagging scheme A may be VXLAN tagging or NVGRE (Network Virtualization using Generic Routing Encapsulation). It is assumed in the example explained below that the tagging scheme A is VXLAN tagging and the tagging scheme B is VLAN tagging.

Each of the domain A (3A), the domain B (3B) and the domain C (3C) includes one or more physical communication apparatuses communicating via one or more networks. A physical communication apparatus is, for example, a physical server or a physical storage apparatus to store data. A domain may include a switch to interconnect a plurality of physical communication apparatuses.

The domain A (3A), the domain B (3B) and the domain C (3C) include the port 31A, the port 31B and the port 31C for connecting with an external network, respectively. For example, the domain A (3A) may be a physical server including the port 31A, the domain B (3B) may be a physical server including the port 31B, and the domain C (3C) may be a physical server including the port 31C.

In the example of FIG. 1, the domain A (3A) establishes a plurality of virtual machines: a virtual machine A1 (10A1) to a virtual machine A5 (10A5), therein. The virtual machine A1 (10A1) to the virtual machine A5 (10A5) perform the network separation for communications using the tagging scheme A. In this example, the tagging scheme A is VXLAN tagging.

A common VXLAN identifier (VNI1) is allocated to the virtual machine A1 (10A1) and the virtual machine A2 (10A2). In FIG. 1, each VXLAN identifier is represented by VNI. VNI represents Virtual Network Identifier. VXLAN tags with the VXLAN identifier 1 (VNI1) are added to these frames. A VXLAN identifier 2 (VNI2), a VXLAN identifier 3 (VNI3) and a VXLAN identifier 4 (VNI4) are allocated to the virtual machine A3 (10A3), the virtual machine A4 (10A4) and the virtual machine A5 (10A5), respectively.

The domain B (3B) establishes a plurality of virtual machines: a virtual machine B1 (10B1) to a virtual machine B5 (10B5), therein. The virtual machine B1 (10B1) to the virtual machine B5 (10B5) perform the network separation for communications using the tagging scheme B. In this example, the tagging scheme B is VLAN tagging.

A VLAN identifier 10 (VID10) is allocated to the virtual machine B1 (10B1). In FIG. 1, each VLAN identifier is represented by VID. The common VLAN identifier 20 (VID20) is allocated to the virtual machine B2 (10B2) and the virtual machine B3 (10B3). A VLAN identifier 30 (VID30) and a VLAN identifier 40 (VID40) are allocated to the virtual machine B4 (10B4) and the virtual machine B5 (10B5), respectively.

The domain C (3C) establishes a plurality of virtual machines: a virtual machine C1 (10C1) to a virtual machine C5 (10C5), therein. The virtual machine C1 (10C1) to the virtual machine C5 (10C5) perform the network separation for communications using the tagging scheme B in addition to the tagging scheme A in combination.

A VLAN identifier 1 (VID1) and a VXLAN identifier 100 (VNI100) are allocated to the virtual machine C1 (10C1). A VLAN identifier 2 (VID2) and the VXLAN identifier 100 (VNI100) are allocated to the virtual machine C2 (10C2).

A common VLAN identifier 3 (VID3) and the common VXLAN identifier 100 (VNI100) are allocated to the virtual machine C3 (10C3) and the virtual machine C4 (10C4). A VLAN identifier 4 (VID4) and a VXLAN identifier 200 (VNI200) are allocated to the virtual machine C5 (10C5).

The management apparatus 2 manages virtual machines lent to customers and networks to allow communications between virtual machines within a group (net group) including the virtual machines. The management apparatus 2 communicates with the network system 100 via a port 28. The management apparatus 2 manages the tag conversion apparatus 1, the domain A (3A), the domain B (3B) and the domain C (3C). The management apparatus 2 includes a system management unit 32, a customer information management unit 22, a domain A control unit 23A, a domain B control unit 23B, a domain C control unit 23C, a tag conversion apparatus control unit 26 and a table storage unit 27.

Figure 2:
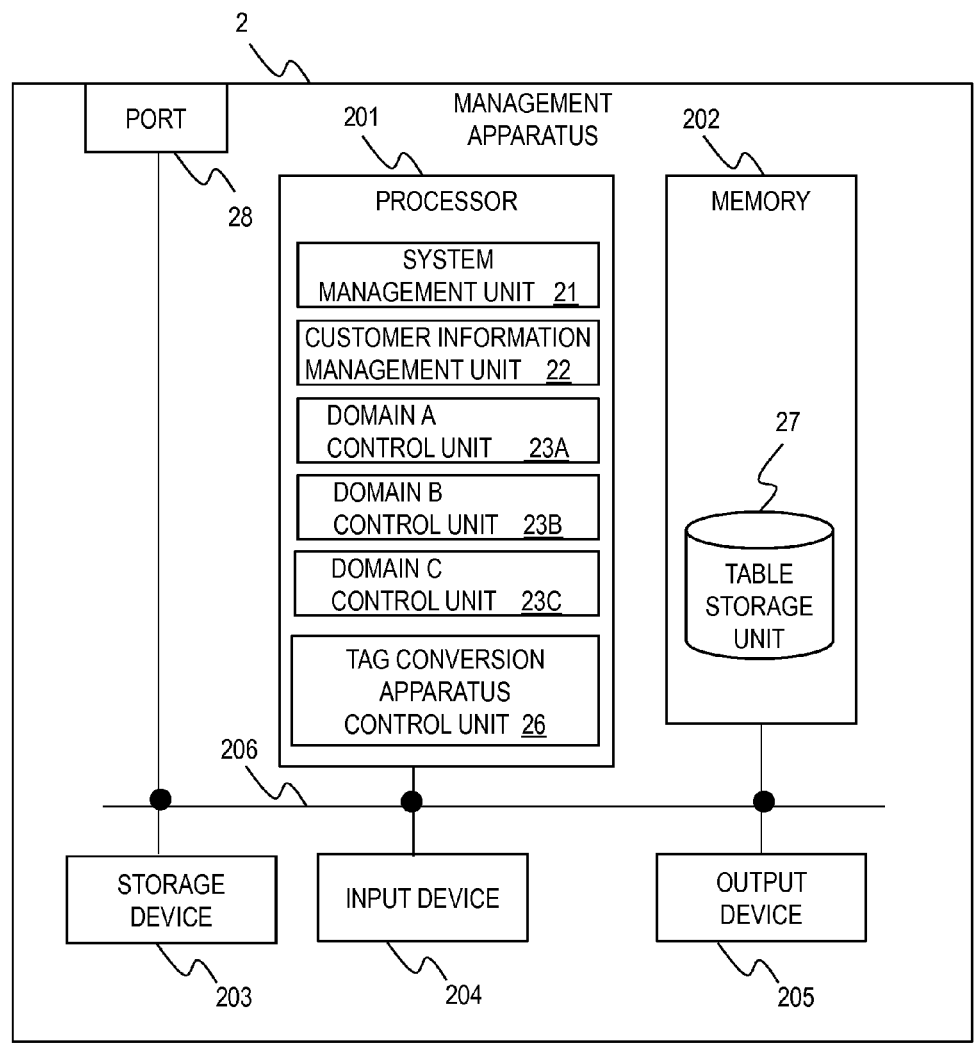
FIG. 2 schematically depicts a hardware configuration example of the management apparatus.

FIG. 2 schematically depicts a hardware configuration example of the management apparatus 2. The management apparatus 2 has a typical computer configuration. The management apparatus 2 is configured to include a processor 201, a memory 202, a storage device 203, an input device 204, an output device 205 and the port 28. The devices are connected with each other via a system bus to communicate with each other.

An administrator inputs necessary information to the management apparatus 2 via the input device 204 and obtains necessary information from the output device 205. The input device 204 includes a keyboard and a mouse, for example. The output device 205 includes a display, for example.

The memory 202 is used for storing information read from the storage device 203 and further, used as a work memory for the processor 201. Volatile memory such as DRAM or nonvolatile memory such as flash memory is used for the memory 202. The memory 202 is capable of reading and writing data at a higher speed than the storage device 203. Typically, nonvolatile memory such as flash memory is used for the storage device 203.

The processor 201 operates in accordance with programs and calculation parameters stored in the memory 202. The processor 201 acts as specific functional units by operating in accordance with the programs. In the present embodiment, the processor 201 functions as the system management unit 21, the customer information management unit 22, the domain A control unit 23A, the domain B control unit 23B, the domain C control unit 23C and the tag conversion apparatus control unit 26. For example, the processor 201 functions as the system management unit 21 by operating in accordance with a system management program. The same applies to the other functional units.

Hereinafter, the subject of operations of each functional unit may be the processor 201, the program executed by the processor 201 implementing each function or the management apparatus 2 including the processor 201. The programs may be copied from a program distribution apparatus or a storage medium to the storage device 203 or the memory 202. This applies to the tag conversion apparatus 1 described later.

The table storage unit 27 stores management information for the management apparatus 2 to manage the network system 100. In the example of FIG. 2, a part of the storage area of the memory 202 functions as the table storage unit 27 and stores the management information. In the description below, various types of information are represented by the expression "XX table". However, the various types of information may be represented by data structures other than the table format. In order to indicate independence from the data structure, the "XX table" can also be referred to as "XX information".

Figure 3:
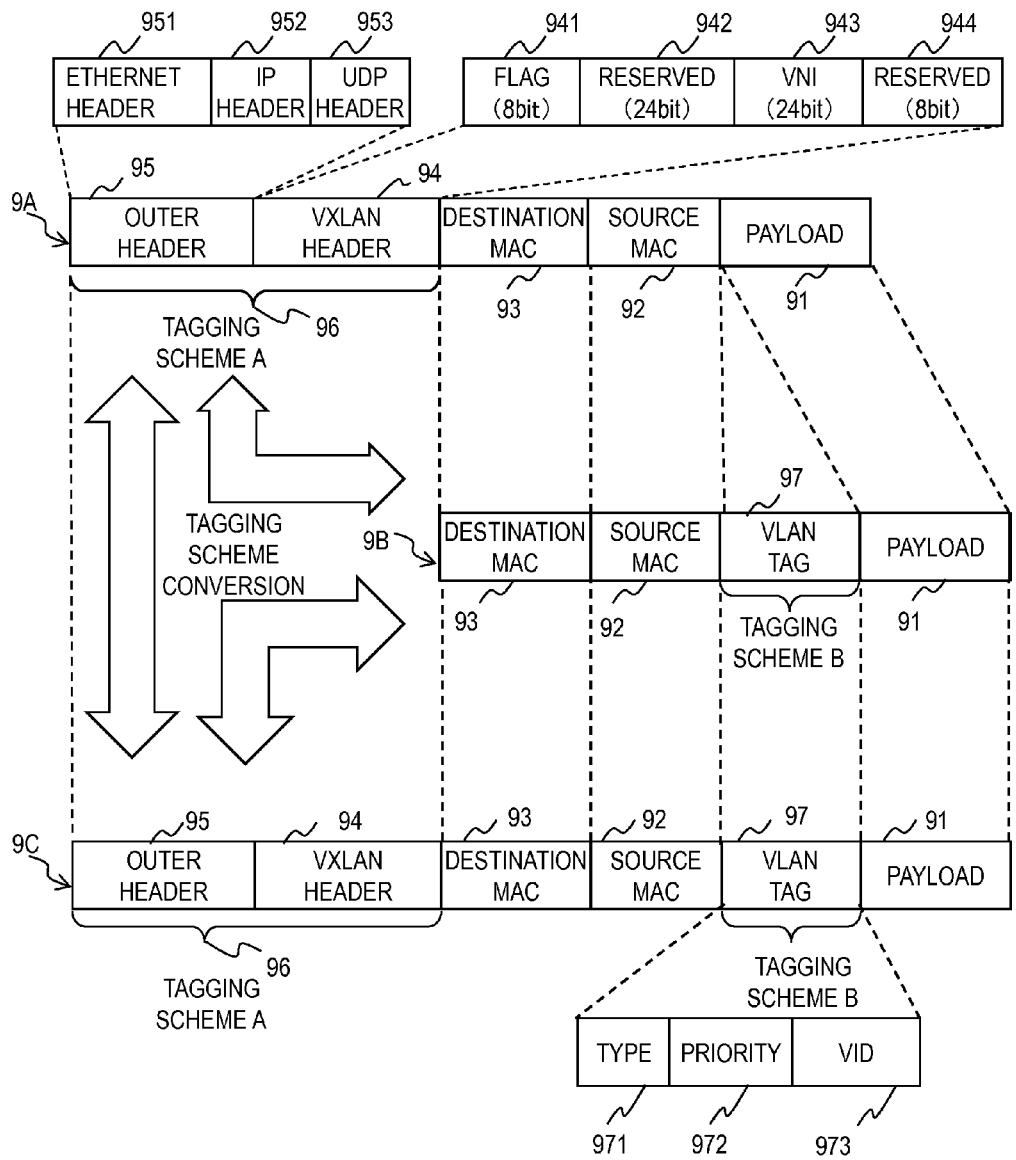
FIG. 3 depicts structure examples of frames transferred in the network system.

FIG. 3 depicts structure examples of frames transferred in the network system 100. The tag conversion apparatus 1 makes conversions between the structures. A frame structure 9A shows a frame structure example in accordance with VXLAN tagging. VXLAN tagging is an example of the tagging scheme A. Data transmitted from a virtual machine (referred as an original MAC frame) is configured to include a payload field 91 storing user data, a source MAC field 92 indicating the MAC address of the source and a destination MAC field 93 indicating the MAC address of the destination.

A virtual machine holds information on the MAC addresses of other virtual machines for data communications. As described later, a virtual machine communicates with other virtual machines in the same domain and different domains, and holds information on the MAC addresses of the other virtual machines.

VXLAN tagging adds a VXLAN header 94 and an outer header 95 to the front of an original MAC frame from a virtual machine. The VXLAN header 94 is configured to include a flag field 941, a VNI field 943 and reserved fields 942 and 944.

The VNI field 943 stores a 24-bit identifier used for network separation. The flag field 941 is an 8-bit width field, and when the bit-3 is 1, in other words, it is 0x08, it indicates that the VNI field 943 is valid. The reserved fields 942 and 944 are reserved bits, and the purpose of the reserved fields 942 and 944 is not defined.

The outer header 95 is configured to include an Ethernet header 951, an IP header 952 and a UDP header 953. The outer header 95 contains information on a tunnel end point (VTEP).

The tunnel end point is, for example, a hypervisor of a virtual machine or a physical server where the virtual machine runs. The tunnel end point refers to the destination MAC field 93 of data received from a virtual machine and determines whether the destination is a local virtual machine or not. When the tunnel end point determines that the destination is not a local virtual machine, the tunnel end point adds the VXLAN header 94 and the outer header 95 to the front of the received data.

The tunnel end point manages the VNIs of the local virtual machines. The VNIs are contained in domain management information described below. The VNI field 943 stores the VNI of the source virtual machine. The tunnel end point stores the IP address of the tunnel end point and the IP address of the tunnel end point managing the destination virtual machine in the IP header 952.

The tunnel end point stores the MAC address of the tunnel end point as the source MAC address and the destination MAC address for IP communication with the destination tunnel end point in the Ethernet header 951. The tunnel end point holds information indicating relations between destination virtual machines and destination tunnel end points. The tunnel end point further holds information on the IP addresses of the destination tunnel end points.

The destination tunnel end point checks the VNI and the destination MAC address in the received VXLAN frame, and then deletes the outer header 95 and the VXLAN header 94. Subsequently, the destination tunnel end point sends the original MAC frame from the source virtual machine to the destination virtual machine.

A frame structure 9B shows a frame structure example in accordance with VLAN tagging. VLAN tagging is an example of the tagging scheme B. Data transmitted from a virtual machine (referred as an original MAC frame) is configured to include the payload field 91 storing user data, the source MAC field 92 indicating the MAC address of the source and the destination MAC field 93 indicating the MAC address of the destination.

VXLAN tagging inserts a VLAN tag 97 between the payload field 91 and the source MAC field 92. A hypervisor, a physical server or a physical switch adds the VLAN tag 97 to the original MAC frame with reference to domain management information described later. The VLAN tag 97 is configured to include a type field 971, a priority field 972 and a VID field 973. The type field 971 indicates the frame is for VLAN tagging and the value is 0x8100.

The priority field 972 specifies the priority level for processing in the case of congestion in the packet forwarding. The VID field 973 stores a 12-bit identifier (VLAN identifier) used for network separation. A switch forwards the frame from the associated port in accordance with the value in the VID field 973.

A frame structure 9C shows a frame structure example in the combination of VXLAN tagging and VLAN tagging (VXLAN+VLAN tagging). VXLAN+VLAN tagging is an example of the tagging scheme A+B. An original MAC frame transmitted from a virtual machine is configured to include the payload field 91 storing user data, the source MAC field 92 indicating the MAC address of the source and the destination MAC field 93 indicating the MAC address of the destination.

VXLAN+VLAN tagging inserts the VLAN tag 97 between the payload field 91 and the source MAC field 92, and further adds the VXLAN header 94 and the outer header 95 to the front of the destination MAC field 93. The tagging methods of VXLAN tagging and VLAN tagging are as described with reference to the frame structures 9A and 9B, respectively.

Figure 4:
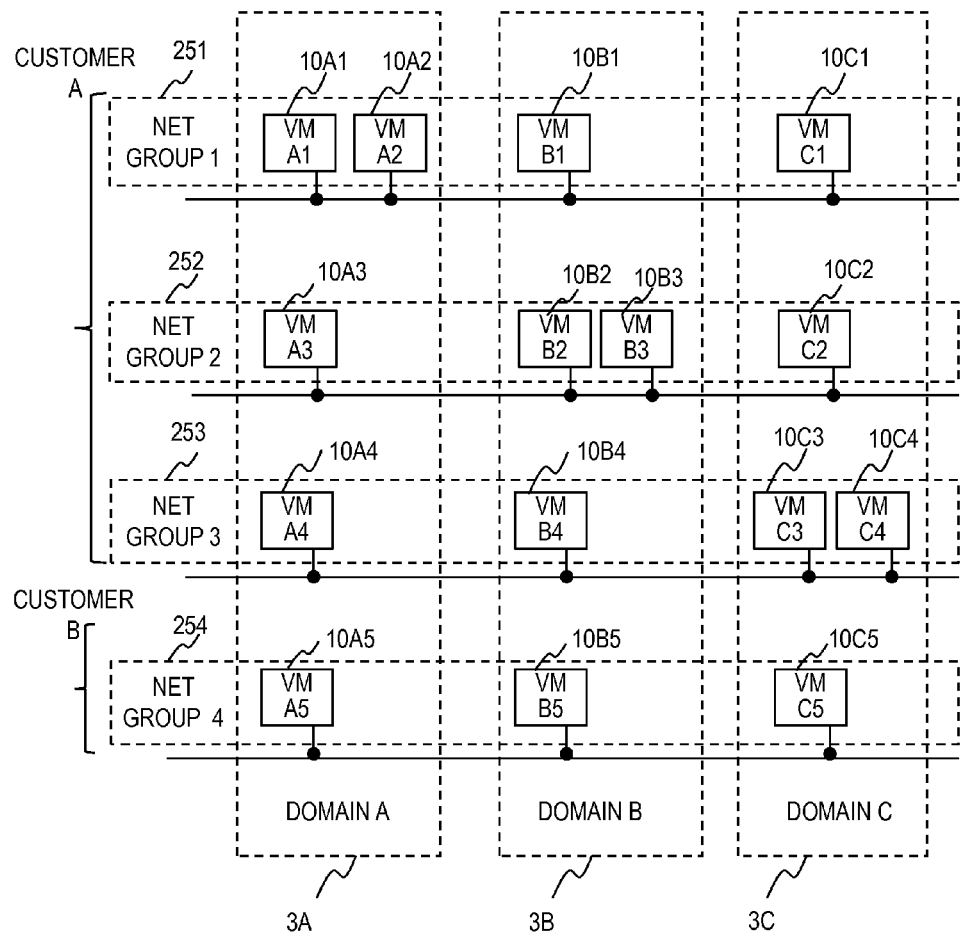
FIG. 4 depicts examples of net groups each configured to include a plurality of virtual machines illustrated in FIG. 1.

FIG. 4 depicts examples of net groups each configured to include a plurality of virtual machines. Each virtual machine is allowed to communicate with only virtual machines belonging to the same net group. A net group can include virtual machines in different domains.

The net group has an ID identifying the net group, and the ID is referred as a net group ID. FIG. 4 shows net groups of the net group ID 1, the net group ID 2, the net group ID 3 and the net group ID 4. The net group of the net group ID k is referred as the net group k.

The net group 1 (251), the net group 2 (252) and the net group 3 (253) are owned by a customer A. The net groups 1 (251) includes the virtual machine A1 (10A1), the virtual machine B1 (10B1) and the virtual machine C1 (10C1). The net group 2 (252) includes the virtual machine A3 (10A3), the virtual machine B2 (10B2) and the virtual machine C2 (10C2).

The net group 3 (253) includes the virtual machine A4 (10A4), the virtual machine B4 (10B4), the virtual machine C3 (10C3) and the virtual machine C4 (10C4). The net group 4 (254) includes the virtual machine A5 (10A5), the virtual machine B5 (10B5) and the virtual machine C5 (1005).

FIG. 5 depicts a configuration example of a customer management table 40 for managing information on net groups and deployed virtual machines. The customer management table 40 is stored in the table storage unit 27. The customer management table 40 includes a customer ID column 41, a net group ID column 42, an installation domain column 43, a tagging scheme column 44, a VMID column 45, a MAC address column 46 and an IP address column 47.

The customer ID column 41 specifies the customer ID of the customer using each of the virtual machines. The net group ID column 42 specifies the ID of the net group to which each of the virtual machines belongs. The installation domain column 43 specifies the ID of the domain where each of the virtual machines is installed. The tagging scheme column 44 specifies respective tagging schemes used in the domains. The VMID column 45 specifies respective IDs of the virtual machines. The MAC address column 46 specifies respective MAC addresses of the virtual machines used in the communications.

The IP address column 47 specifies respective IP addresses of the virtual machines for VXLAN tagging, to be specific, the IP addresses of the tunnel end points for the virtual machines. The value in the IP address column 47 is used in the outer header 95 of a VXLAN tagging frame in the frame forwarding within a domain or across different domains.

The virtual machines in the domain B (3B) have the common IP address and the common IP address is used for communications with other domains. A virtual machine in another domain includes the common IP address in the destination IP address of the outer header 95 of a frame to the domain B (3B). The tag conversion apparatus 1 includes the common IP address in the source IP of a frame from the domain B (3B). The IP address of the domain B (3B) may be the IP address of the tag conversion apparatus 1.

For example, a datacenter business operator deploys virtual machines and defines net groups based on requests from customers. The datacenter business operator generates the customer management table 40. For example, the system management unit 21 provides a GUI and the datacenter business operator generates the customer management table 40 using the input device 204 and the output device 205 of the management apparatus 2. The datacenter business operator may generate the customer management table 40 at a terminal not shown and send it to the system management unit 21.

The system management unit 21 enters the generated customer management table 40 to the customer information management unit 22. The customer information management unit 22 saves the entered customer management table 40 to the table storage unit 27.

Figure 6A:
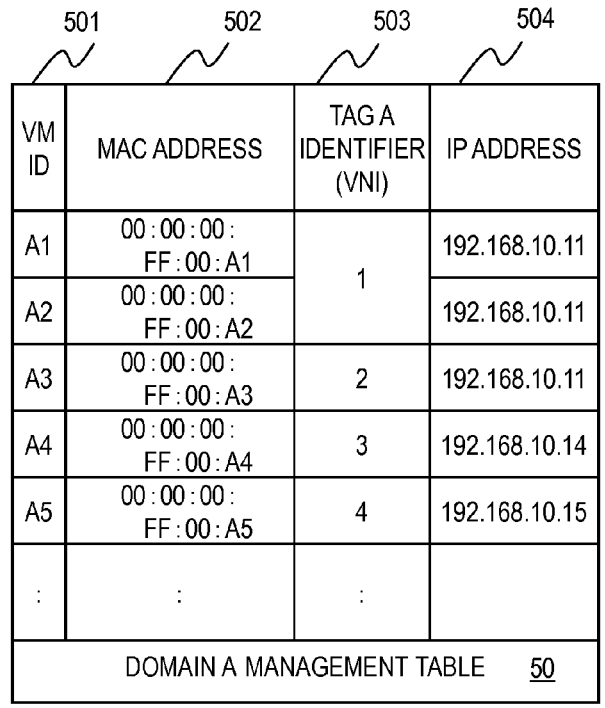
FIG. 6A depicts a configuration example of a domain A management table for a domain A.
Figure 6B:
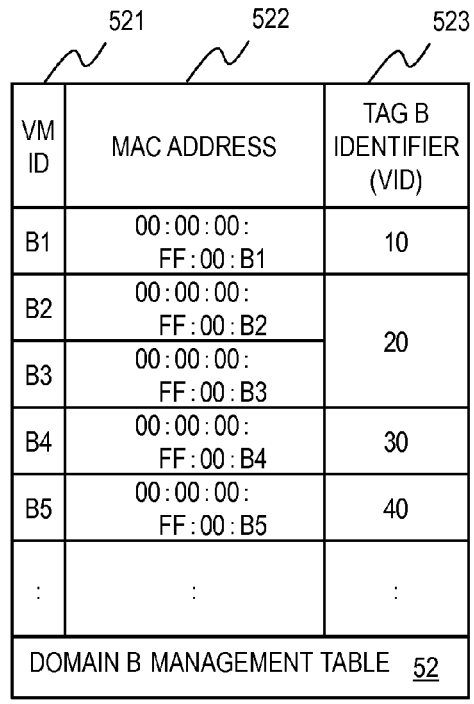
FIG. 6B depicts a configuration example of a domain B management table for a domain B.

FIGS. 6A, 6B and 6C depict configuration examples of domain management tables of the domain A (3A), the domain B (3B) and domain C (3C), respectively. The domain management table manages information on virtual machines in the domain.

FIG. 6A depicts a configuration example of a domain A management table 50 for the domain A (3A). The domain A management table 50 includes a VMID column 501, a MAC address column 502, a tag A identifier column 503 and an IP address column 504.

The VMID column 501 specifies respective identifiers of the virtual machines included in the domain A (3A). The MAC address column 502 specifies respective MAC address of the virtual machines for communications. The tag A identifier column 503 specifies respective identifiers allocated to the virtual machines for network separation in the tagging A scheme. In this example, the VXLAN identifier VNI is used for the identifier for network separation. The IP address column 504 specifies the IP addresses of respective tunnel end points for the virtual machines.

For example, the tag A identifier "1" is allocated to the virtual machine with the VMID "A1". The tag A identifier "1" is also allocated to the virtual machine with the VMID "A2".

FIG. 6B depicts a configuration example of a domain B management table 52 of the domain B (3B). The domain B management table 52 includes a VMID column 521, a MAC address column 522 and a tag B identifier column 523.

The VMID column 521 specifies respective identifiers of the virtual machines included in the domain B (3B). The MAC address column 522 specifies respective MAC address of the virtual machines for communications. The tag B identifier column 523 specifies respective identifiers allocated to the virtual machines for network separation in the tagging B scheme. In this example, the VLAN identifier VID is used for the identifier for network separation.

For example, the tag B identifier "10" is allocated to the virtual machine with the VMID "B1". The tag B identifier "20" is allocated to the virtual machine with the VMID "B2" and the virtual machine with the VMID "B3".

FIG. 6C depicts a configuration example of a domain C management table 54 of the domain C (3C). The domain C management table 54 includes a VMID column 541, a MAC address column 542, a tag A identifier column 543, a tag B identifier column 544 and an IP address column 545.

The VMID column 541 specifies respective identifiers of the virtual machines included in the domain C (3C). The MAC address column 542 specifies respective MAC addresses of the virtual machines for communications.

The tag A identifier column 543 specifies respective identifiers allocated to the virtual machines for network separation in the tagging A scheme. In this example, the VXLAN identifier VNI is used. The tag B identifier column 544 specifies respective identifiers allocated to the virtual machines for network separation in the tagging B scheme. In this example, the VLAN identifier VID is used. The IP address column 545 specifies the IP addresses of respective tunnel end points in the tagging A scheme for the virtual machines.

For example, the tag A identifier "100" and the tag B identifier "1" are allocated to the virtual machine with the VMID "C1". The tag A identifier "100" and the tag B identifier "2" are allocated to the virtual machine with the VMID "C2".

The domain A management table 50, the domain B management table 52, and the domain C management table 54 are stored in the table storage unit 27. The domain A management table 50 is set in the domain A (3A) by the domain A control unit 23A. The domain B management table 52 is set in the domain B (3B) by the domain B control unit 23B. The domain C management table 54 is set in the domain C (3C) by the domain C control unit 23C. The domain management table is set in hypervisors, physical servers and switches in the domain.

The domains 3A, 3B and 3C each hold information on the virtual machines in the other domains in addition to information on the virtual machines in their own domains. For example, each domain holds information on the identifiers, MAC addresses and IP addresses in VXLAN tagging of the virtual machines in the other domains. The domains 3A, 3B and 3C receive the information from the management apparatus 2.

Figure 7:
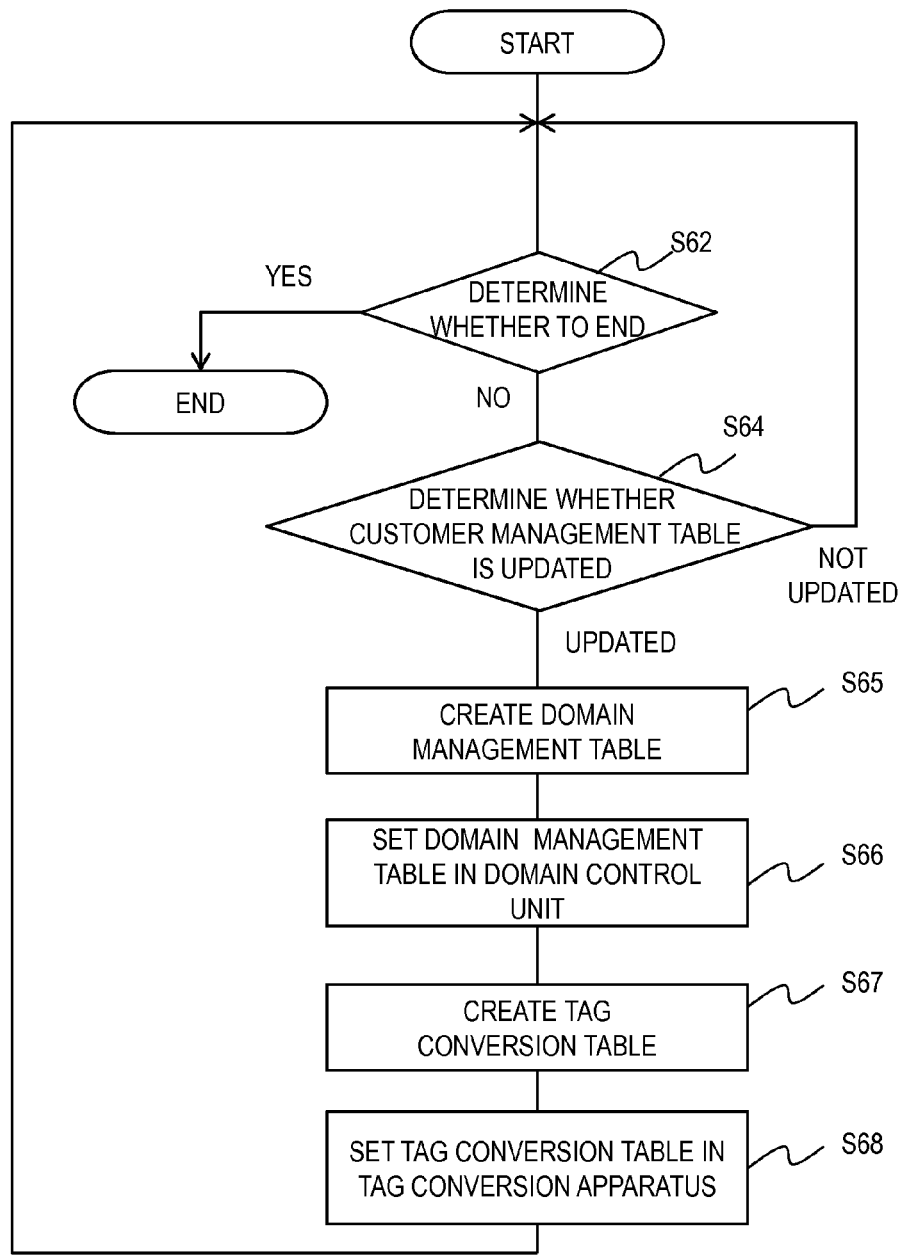
FIG. 7 depicts a flowchart for the management apparatus to create the domain A management table, the domain B management table, the domain C management table and a tag conversion table.

FIG. 7 depicts a flowchart for the management apparatus 2 to create the domain A management table 50, the domain B management table 52, the domain C management table 54 and the tag conversion table 80. The management apparatus 2 creates the tables from the customer management table 40.

The system management unit 21 determines whether to end the flow (S62). For example, when the system management unit 21 has received a system shutdown instruction, the system management unit 21 determines to end the flow (S62: Yes).

When the system management unit 21 determines not to end the flow (S62: No), the system management unit 21 determines whether the customer management table 40 is updated (S64). When the customer management table 40 is updated (S64: Updated), the system management unit 21 creates the domain management tables (S65).

In the creation of the domain management tables (S65), the system management unit 21 creates respective domain management tables for the domains based on the customer management table 40. For example, in the creation of the domain A management table 50 of the domain A (3A), the system management unit 21 selects entries of virtual machines showing "domain A" in the installation domain column 43 from the customer management table 40.

The system management unit 21 determines a unique tag A identifier for each net group ID. It allows grouping virtual machines permitted to communicate with each other in a domain into one group by the same tag A identifier. The system management unit 21 selects the VMIDs, the MAC addresses and the IP addresses from the information on the virtual machines of the domain A (3A) retrieved from the customer management table 40, and creates the domain A management table 50 from the selected information and the determined tag A identifiers.

For example, the customer management table 40 illustrated in FIG. 5 specifies virtual machines whose values of the installation domain column 43 are "domain A" and values of the VMID column 44 are "A1" "A2" "A3" "A4" "A5". The system management unit 21 selects these entries from the customer management table 40.

Next, the system management unit 21 determines the common tag A identifier "1" for the virtual machine A1 and the virtual machine A2 whose values of the net group ID column 42 are "1". The value of the tag A identifier is not restricted as long as the value is sole and unique in the domain A management table 50.

The system management unit 21 determines the tag A identifier "2" different from the previously set value "1" for the virtual machine A3 whose value of the net group ID column 42 is "2". Likewise, the system management unit 21 determines unique tag A identifiers different between net groups.

The system management unit 21 stores the information obtained from the customer management table 40 in the VMID column 501, the MAC address column 502 and the IP address column 504 of the domain A management table 50. Further, the system management unit 21 stores the tag A identifiers determined for the virtual machines of the domain A (3A) in the tag A identifier column 503 of the domain A management table 50.

The system management unit 21 creates the domain B management table 52 in a manner similar to the domain A management table 50. The system management unit 21 selects entries of virtual machines whose values of the installation domain column 43 are "domain B" from the customer management table 40. The system management unit 21 determines unique tag B identifiers for the net groups. The value of the tag B identifier is not restricted as long as the value is sole and unique in the domain B management table 52. The determined tag B identifier assembles virtual machines permitted to communicate with each other in a domain into the same group.

The system management unit 21 determines tag B identifiers in the creation of the domain C management table 54, in a manner similar to the tag A identifiers in the creation of the domain A management table 50. In this embodiment, the system management unit 21 determines a unique tag A identifier for each of the values in the customer ID column 41.

In the example of the customer management table 40 illustrated in FIG. 5, values of the customer ID column 41 are "customer A" for virtual machines with "C1" to "C4" as values of the VMID column 45. The system management unit 21 determines values of the tag A identifier column 543 for the virtual machines to be "100".

In the example of the customer management table 40 illustrated in FIG. 5, a value of the customer ID column 41 is "customer B" for a virtual machine with "C5" as a value of the VMID column 45. The system management unit 21 determines a value of the tag A identifier column 543 for the virtual machine to be "200" different from the previously set value "100".

The determined tag A identifier for each customer in the domain C (3C) allows the system to obtain statistic information for each customer. For example, the tag conversion apparatus 1 is equipped with a statistic information acquisition device such as a communication traffic counter and a discard amount counter for each tag A identifier, and acquires statistic information for the customer associated with each tag A identifier. The tag conversion apparatus 1 performs the band control in the networks for individual tag A identifiers.

In the above described example, the tag A identifier in the domain A (3A), the tag B identifier in the domain B (3B) and the tag B identifier in the domain C (3C) are allocated to each net group ID. The tag A identifier in the domain C (3C) is allocated to each customer ID. A customer uses one or more net groups. In the above described example, the customer A uses three net groups.

A plurality of tag identifiers of a plurality of net group IDs are grouped by one tag identifier allocated to one customer ID. The configuration to acquire the statistic information and perform the band control with reference to tag identifiers associated with customer IDs allows a reduction in the necessary resources, compared with a configuration to acquire the statistic information and perform the band control for tag identifiers associated with net group IDs.

The system management unit 21 may determine values in the tag A identifier column 54 of the domain C management table 54 based on a criterion different from the customer ID. For example, the system management unit 21 determines virtual machines to allocate the same tag A identifier based on the communication traffic of the virtual machines. Specifically, the system management unit 21 obtains the communication traffic history of each virtual machine during a specific period from the network system 100. For example, a hypervisor monitors the communication traffic of local virtual machines and sends the information to the system management unit 21. The communication traffic may be represented by the communication data traffic per unit time.

The system management unit 21 groups virtual machines and allocated different tag A identifiers to the groups. For example, the system management unit 21 groups virtual machines based on the traffic histories of individual virtual machines during a specific period such that the total communication traffic of each group falls within a predefined threshold range. The system management unit 21 may group virtual machines such that differences of the total communication traffic between the groups fall within a predefined threshold range.

For example, the tag conversion apparatus 1 is equipped with a statistic information acquisition device such as a communication traffic counter and a discard amount counter for each tag A identifier, and performs the band control for each tag A identifier. Grouping virtual machines so as to level the communication traffic of the groups allows a decrease in the variations of periods for collecting counter values for the statistic information. One group may be composed of one or more virtual machines.

Next, each domain control unit sets the created domain management table in the corresponding domain in accordance with an instruction from the system management unit 21 (S66). For example, the hypervisor in the domain A (3A) uses the tag A identifier "1" for communications between the virtual machine A1 and the virtual machine A2 based on the set domain A management table 50. The domain B (3B) and the domain C (3C) separate networks using the set tag identifiers in similar manners.

Next, the system management unit 21 creates the tag conversion table 80 to be set in the tag conversion apparatus 1 (S67). The created tag conversion table 80 is stored in the table storage unit 27. The tag conversion apparatus control unit 26 sets the created tag conversion table 80 in the tag conversion apparatus 1 (S68).

The management apparatus 2 returns to Step S62 after setting the tag conversion table 80 in the tag conversion apparatus 1. The management apparatus 2 repeats the above described steps until Yes is determined at the end determination step (S62). Whenever the customer management table 40 is updated, the management apparatus 2 updates the domain management tables 50, 52 and 54 and the tag conversion table 80, and set the tables in the domain A (3A), the domain B (3B), the domain C (3C) and the tag conversion apparatus 1, respectively.

FIG. 8 depicts a configuration example of the tag conversion table 80. The tag conversion apparatus 1 converts tags of communication frames between different domains with reference to the tag conversion table 80. The tag conversion table 80 is configured to include the tag information on the tag A identifier and the tag B identifier in addition to the customer information of the customer management table 40.

Specifically, the tag conversion table 80 includes a customer ID column 801, a net group ID column 802, an installation domain column 803, a tagging scheme column 804, a VMID column 805, a MAC address column 806 and an IP address column 807. The tag conversion table 80 further includes a tag B identifier column 808 and a tag A identifier column 809.

The customer ID column 801, the net group ID column 802, the installation domain column 803, the tagging scheme column 804, the VMID column 805, the MAC address column 806 and the IP address column 807 each store the same information as the customer management table 40.

The information stored in the tag B identifier column 808 is the same as the integrated information of the tag B identifier column 523 of the domain B management table 52 illustrated in FIG. 6B and the tag B identifier column 544 of the domain C management table 54 illustrated in FIG. 6C.

The information stored in the tag A identifier column 809 is the same as the integrated information of the tag A identifier column 503 of the domain A management table 50 illustrated in FIG. 6A and the tag A identifier column 543 of the domain C management table 54 illustrated in FIG. 6C.

The system management unit 21 creates the tag conversion table 80 from the customer management table 40, the domain A management table 50, the domain B management table 52 and the domain C management table 54.

For example, when the VMID is "A1", the information on the virtual machine is stored in the domain A management table 50. The system management unit 21 refers to the domain A management table 50 and obtains the information of the entry for which the VMID column 501 specifies "A1".

The entry has the value "1" in the tag A identifier column 503. The system management unit 21 stores the value in the cell of the tag A identifier column 809 of the tag conversion table 80 for the entry with the VMID "A1".

The virtual machine with the VMID "A1" is not allocated any tag B identifier. Thus, the cell of the tag B identifier column 808 of the tag conversion table 80 does not store any value for the entry with the VMID "A1".

When the VMID is "C1", the information on the virtual machine is stored in the domain C management table 54. The system management unit 21 obtains the information of the entry for which the VMID column 501 specifies "C1" from the domain C management table 54. The entry has the value "100" in the tag A identifier column 543 and the value "1" in the tag B identifier column 544.

The system management unit 21 stores "100" in the cell of the tag A identifier column 809 of the tag conversion table 80 for the entry with the VMID "C1". The system management unit 21 stores "1" in the cell of the tag B identifier column 808 for the entry with the VMID "C1".

The system management unit 21 stores the tag A identifiers and the tag B identifiers of all the VMIDs in the tag conversion table 80 in addition to the information stored in the customer management table 40. Thereby, the tag conversion table 80 is created.

Figure 9A:
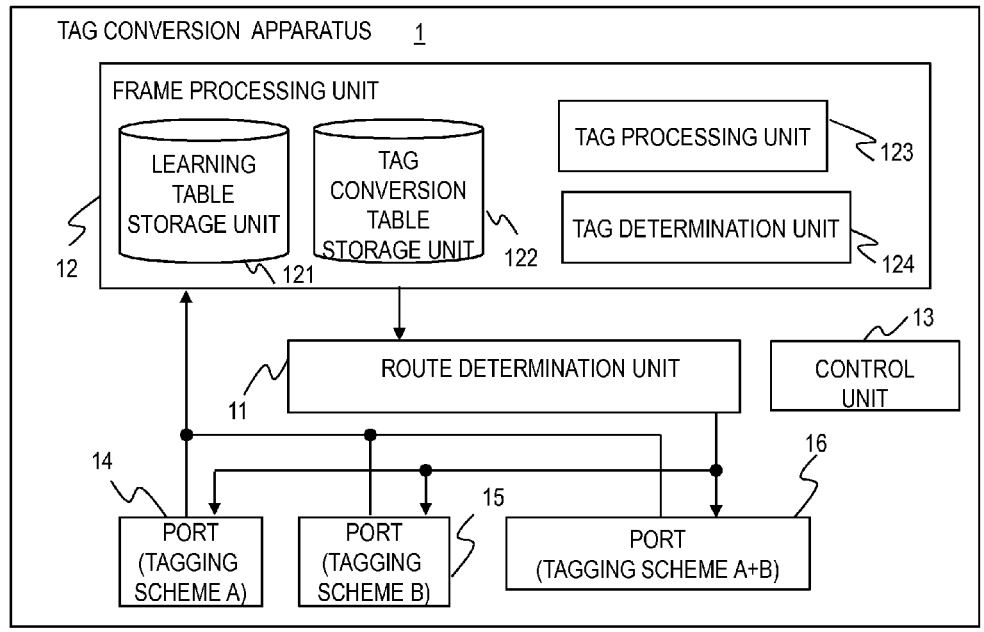
FIG. 9A depicts a logical configuration example of a tag conversion apparatus.

FIG. 9A depicts a logical configuration example of the tag conversion apparatus 1. The tag conversion apparatus 1 is configured to include a route determination unit 11, a frame processing unit 12, a control unit 13, a port (tagging scheme A) 14, a port (tagging scheme B) 15 and a port (tagging scheme A+B) 16. The frame handling unit 12 is configured to include a learning table storage unit 121, a tag conversion table storage unit 122, a tag processing unit 123 and a tag determination unit 124.

The learning table storage unit 121 specifies relations between IP addresses, MAC addresses and output ports. The control unit 13 manages and updates the learning table. The tag conversion table storage unit 122 stores the tag conversion table 80 received from the management apparatus 2.

The port (tagging scheme A) 14 is a port for transmitting and receiving frames to and from the domain A (3A) of the tagging scheme A. The port (tagging scheme B) 15 is a port for transmitting and receiving frames to and from the domain B (3B) of the tagging scheme B. The port (tagging scheme A+B) 16 is a port for transmitting and receiving frames to and from the domain C (3C) of the tagging scheme A+B.

Figure 9B:
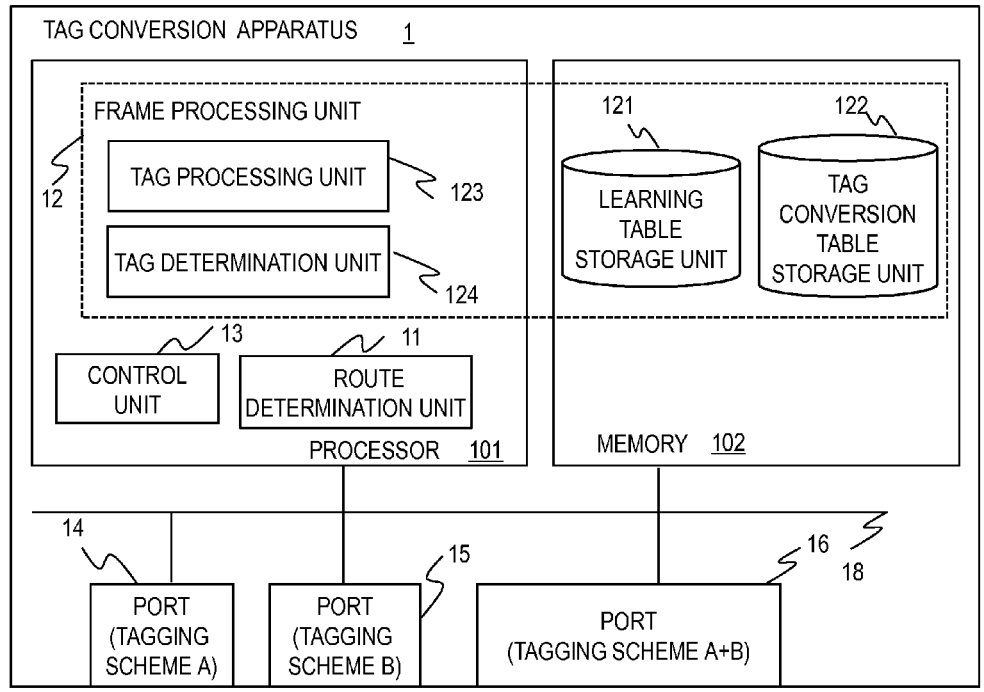
FIG. 9B depicts a hardware configuration example of the tag conversion apparatus.

FIG. 9B depicts a hardware configuration example of the tag conversion apparatus 1. The tag conversion apparatus 1 is configured to include a processor 101, a memory 102, the port (tagging scheme A) 14, the port (tagging scheme B) 15 and the port (tagging scheme A+B) 16. The configuration including the processor 101 and the memory 102 is a controller. The devices are connected with each other to communicate via a system bus 18. The tag conversion apparatus 1 further includes a port for communicating with the management apparatus.

The explanation for the management apparatus 2 may apply to the processor 101 and the memory 102. The processor 101 acts as the route determination unit 11, the frame processing unit 12, the control unit 13, the tag processing unit 123 and the tag determination unit 124 by operating in accordance with programs stored in the memory 102. At least part of the functional units of the tag conversion apparatus 1 may be implemented by dedicated logical circuits different from the processor 101. A part of the memory area of the memory 102 functions as the learning table storage unit 121 storing the learning table and another part of the memory area of the memory 102 functions as the tag conversion table storage unit 122 storing the tag conversion table 80.

A frame input from the port (tagging scheme A) 14 is transferred to the frame processing unit 12. The port (tagging scheme A) 14 is connected with the domain A (3A) and a input frame has the frame structure 9A illustrated in FIG. 3.

The tag determination unit 124 searches the tag conversion table 80 for the values of the source MAC field 92 and the destination MAC field 93, and selects the information of corresponding entries. When the virtual machine indicated by the source MAC field 92 and the virtual machine indicated by the destination MAC field 93 belong to different net groups, the tag determination unit 124 discards this frame.

The net group ID column 802 of the tag conversion table 80 specifies the ID of the net group to which each virtual machine belongs.

When the virtual machine indicated by the source MAC field 92 and the virtual machine indicated by the destination MAC field 93 belong the same net group and different domains, the tag processing unit 123 converts the tag of the input frame to the tag for the destination MAC field 93. The tag processing unit 123 obtains the input frame from the tag determination unit 124 and converts the tag based on the information of the entries including the values of the source MAC field 92 and the destination MAC field 93, respectively.

For example, it is assumed that the source MAC field 92 contains "00:00:00:FF:00:B1" and the destination MAC field 93 contains "00:00:00:FF:00:A1". The installation domain column 803 of the tag conversion table 80 specifies that the source belongs to the domain B (3B) and the destination belongs to the domain A (3A). Further, the tagging scheme column 804 specifies that the domain B (3B) employs the tagging scheme B and the domain A (3A) employs the tagging scheme A.

The tag processing unit 123 converts the frame structure of the input frame from the VLAN frame structure 9B to the VXLAN frame structure 9A. Specifically, the tag processing unit 123 adds the VXLAN header 94 and the outer header 95 to the input frame.

The VNI field 943 (tag A identifier) of the added VXLAN header 94 specifies "1". The IP header 952 of the outer header 95 specifies the source IP address "192.168.10.22" and the destination IP address "192.168.10.11". The learning table storage unit 121 stores the learning table associating IP addresses and MAC addresses. The tag processing unit 123 refers to the learning table and determines the addresses to be stored in the Ethernet header 951.

As another example, it is assumed that the source MAC field 92 contains "00:00:00:FF:00:B1" and the destination MAC field 93 contains "00:00:00:FF:00:C1". The installation domain column 803 of the tag conversion table 80 specifies that the source belongs to the domain B (3B) and the destination belongs to the domain C (3C). Further, the tagging scheme column 804 specifies that the domain B (3B) employs the tagging scheme B and the domain C (3C) employs the tagging scheme A+B.

The tag processing unit 123 converts the frame structure of the input frame from the VLAN frame structure 9B to the VXLAN+VLAN frame structure 9C. Specifically, tag processing unit 123 changes the value in the VLAN tag 97 of the input frame to the value of the destination. The value of the VID field 973 (tag B identifier) in the VLAN tag 97 is converted from "10" to "1".

Further, the VXLAN header 94 and the outer header 95 are added to the input frame. The VNI field 943 (tag A identifier) of the added VXLAN header 94 specifies "100". The IP header 952 of the outer header 95 specifies the source IP address "192.168.10.22" and the destination IP address "192.168.10.33". The tag processing unit 123 stores the addresses corresponding to the IP addresses in the Ethernet header 951.

When the source virtual machine and the destination virtual machine belong to the same net group and the same domain, the tag processing unit 123 does not convert the frame structure. In another case, when the source virtual machine and the destination virtual machine belong to the same net group, and the source domain and the destination domain employ the same tagging scheme, the tag processing unit 123 does not convert the frame structure. When the tag identifiers (VID or VNI) of the source virtual machine and the destination virtual machine are the same, the tag identifier of the frame is maintained. When the tag identifiers (VID or VNI) of the source virtual machine and the destination virtual machine are different, the tag identifier of the frame is converted.

The route determination unit 11 determines an output port for a frame with the converted tag or obtained without tag conversion and transmits the frame from the output port. The route determination unit 11 refers to the destination MAC field 93, the Ethernet header 951 or the IP header 952 depending on whether the tag conversion has been performed and the frame structure of the obtained frame, and determines the output port to be a port associated in advance with the destination in the learning table.

For example, the destination MAC field 93 is referred in the frame structure 9B of the tagging scheme B. In the frame structure 9A of the tagging scheme A and the frame structure 9C of the tagging scheme A+B, the destination in the Ethernet header 951 or the IP header 952 is referred depending on whether the tag conversion has been performed.

As described above, the tag conversion storage unit 122 may retains the finished tag conversion table 80. Alternatively, entries may be added successively to the tag conversion table stored in the tag conversion storage unit 122. For example, when the value of the source MAC field 92 or the destination MAC field 93 is not recorded in the tag conversion storage unit 122, the tag determination unit 124 sends an inquiry specifying the MAC address to the management apparatus 2.

The tag conversion apparatus control unit 26 of the management apparatus 2 searches the tag conversion table 80 stored in the table storage unit 27 for the specified MAC address and returns the search result to the tag conversion apparatus 1. When the specified MAC address is recorded in the tag conversion table 80, the tag conversion apparatus control unit 26 sends the information of the entry to the tag conversion apparatus 1. The tag determination unit 124 records the received information into the tag conversion table stored in the tag conversion storage unit 122.

Figure 10:
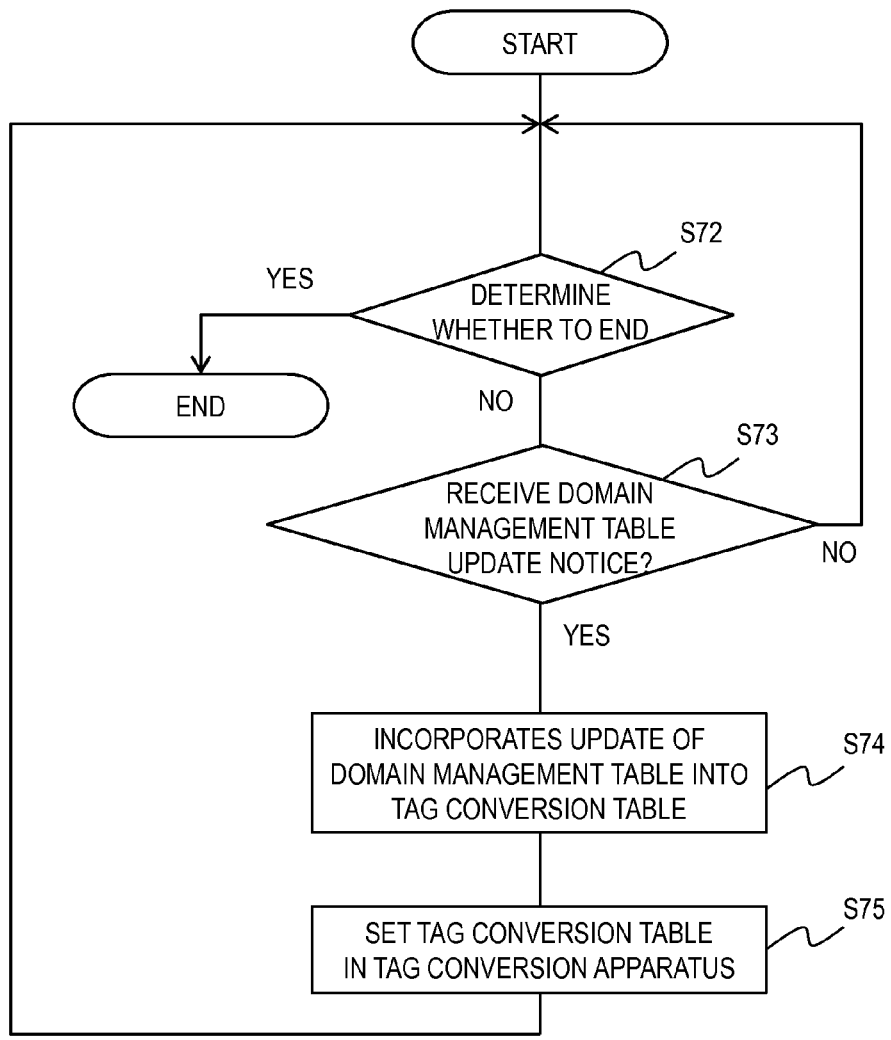
FIG. 10 depicts a flowchart for updating the tag conversion table upon an update of the management table of each domain.

FIG. 10 depicts a flowchart for updating the tag conversion table 80 in response to an update of the management table of a domain. It allows the tag conversion conforming to the domain configuration. For example, there is a case where an administrator is assigned for each domain and the identifier of a domain is changed by the assigned administrator.

The system management unit 21 determines whether to end the flow (S72). For example, when the system management unit 21 has received a system shutdown instruction, the system management unit 21 determines to end the flow (S72: Yes).

When the system management unit 21 determines not to end the flow (S72: No), the system management unit 21 determines whether any one of the domain management table has been updated (S73). When no domain management table 40 is updated (S73: No), the system management unit 21 returns to Step S72.

When any one of the domain management table is updated (S73: Yes), the domain informed the management apparatus 2 of the update. For example, when the management table 50 of the domain A (3A) is updated, the update is informed from the domain A (3A) to the management apparatus 2. The domain A control unit 23 receives the updated domain A management table 50 or the updated differences of the domain A management table 50. The domain A control unit 23 incorporates the received information into the table storage unit 27. The updated domain management table is set in the corresponding domain.

The system management unit 21 incorporates the contents of the updated domain A management table 50 into the tag conversion table 80 in manner similar to the creation of the tag conversion table 80 (S67) and records the tag conversion table 80 into the table storage unit 27 (S74). The tag conversion control unit 26 set the updated tag conversion table 80 in the tag conversion apparatus (S75). Subsequently, the system management unit 21 returns to Step S72.

The present embodiment allows communication apparatuses in domains under network separation by different tagging schemes to be connected with each other to constitute a net group and communicate with each other. For example, it is possible to establish a net group including a communication apparatus of VLAN tagging, a communication apparatus of VXLAN tagging and a communication apparatus of VXLAN+VLAN tagging to create a net group across different tagging schemes. The present embodiment allows flexible creation of a net group independently of tagging schemes of communication apparatuses.

The present embodiment creates the tag conversion table based on the customer management table specifying configuration of virtual machines and tagging schemes, and determines the tag identifier for each virtual machine based on the tag conversion table. It allows flexible network management. For example, it is possible to associate a plurality of tag B identifiers with one tag A identifier in a multiple tagging scheme. Acquiring the statistic information on the frames and performing the band control for the frames with reference to the tag A identifier allow a reduction in the necessary resources for the acquisition of the statistic information on the frames and the band control for the frames.

In the above described example, the management apparatus 2 creates the domain management tables. Alternatively, the domain management tables may be preset by a user. The management apparatus 2 creates the tag conversion table 80 using the preset domain management tables. The tag conversion according to the present embodiment may be applied to a frame (data unit) in any protocol layer. The tagging scheme of the domain may be a multiple tagging scheme using three or more tags.

Embodiment 2

Figure 11:
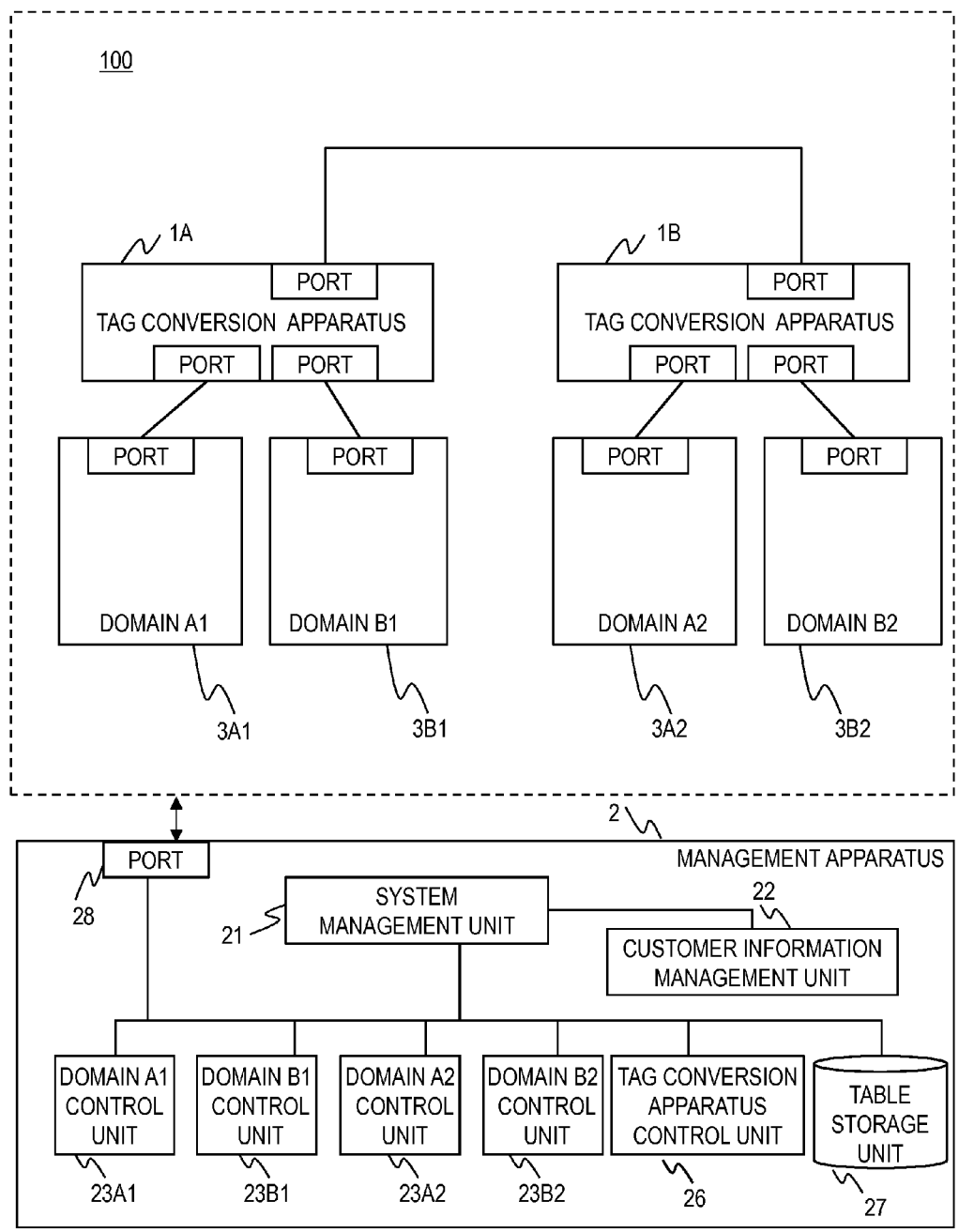
FIG. 11 schematically depicts a configuration example of a system including the network system and the management apparatus managing the network system according to Embodiment 2.

FIG. 11 schematically depicts a configuration example of a system including the network system 100 and the management apparatus 2 managing the network system 100 according to the present embodiment. The present embodiment mainly explains differences from Embodiment 1. In Embodiment 1, the tag conversion apparatus 1 is connected with the domain A (3A), the domain B (3B) and the domain C (3C).

As illustrated in FIG. 11, the domain C (3C) is not present in the present embodiment. The network system 100 according to the present embodiment includes a domain A1 (3A1) and a domain A2 (3A2) employing the same tagging scheme A, and a domain B1 (3B1) and a domain B2 (3B2) employing the same tagging scheme B.

Further, the network system 100 according to the present embodiment includes two tag conversion apparatuses 1A and 1B. The domain A1 (3A1) and the domain B1 (3B1) are connected with ports of the tag conversion apparatus 1A. The domain A2 (3A2) and the domain B2 (3B1) are connected with ports of the tag conversion apparatus 1B. Ports of the tag conversion apparatuses 1A and 1B are connected and frames are transferred between the tag conversion apparatuses 1A and 1B. The internal configuration of the tag conversion apparatuses 1A and 1B is the same as the tag conversion apparatuses 1 according to Embodiment 1.

The management apparatus 2 includes a domain A1 control unit 23A1, a domain A2 control unit 23A2, a domain B1 control unit 23B1 and a domain B2 control unit 23B2. They control respective domains.

Figure 12:
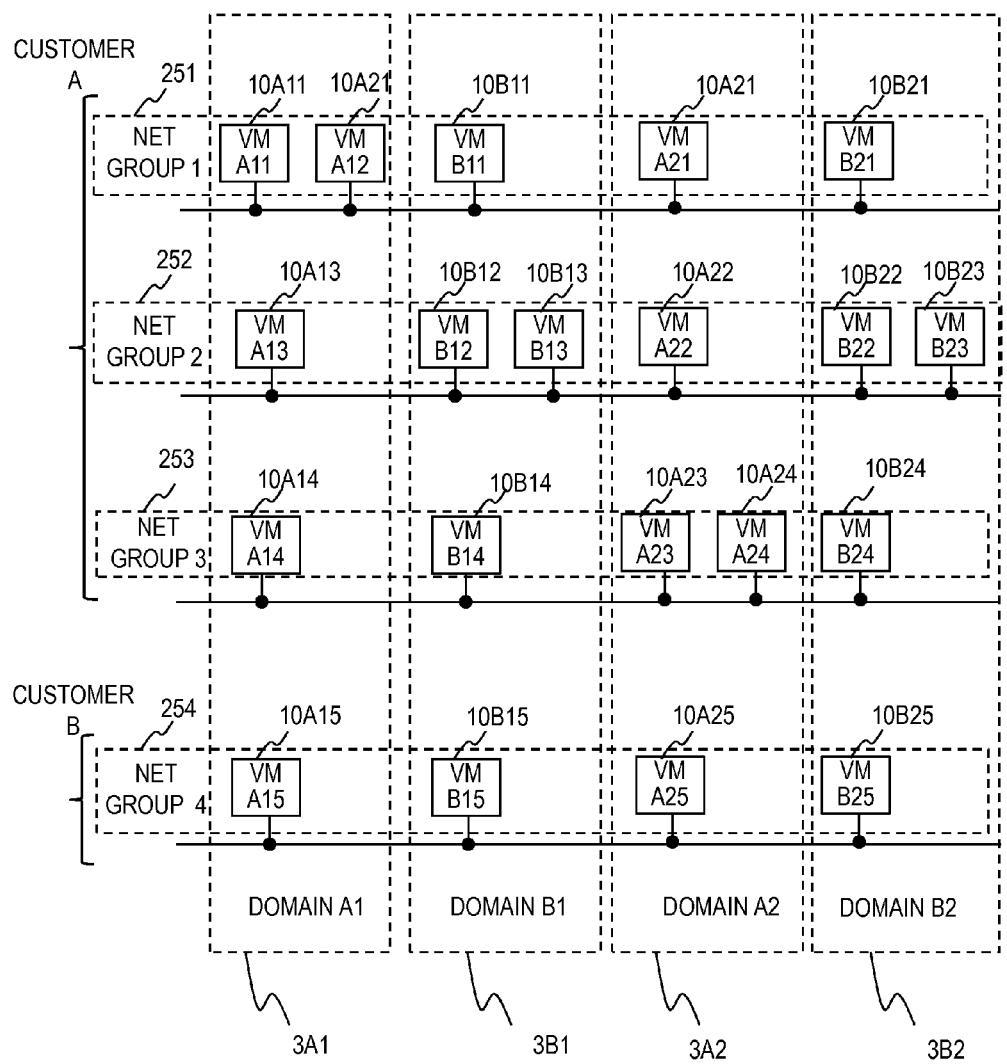
FIG. 12 depicts examples of net groups each configured to include a plurality of virtual machines illustrated in FIG. 11.

FIG. 12 depicts examples of net groups each configured to include a plurality of virtual machines. A virtual machine A11 (10A11) to a virtual machine A15 (10A15) belong to the domain A1 (3A1). A virtual machine B11 (10B11) to a virtual machine B15 (10B15) belong to the domain B1 (3B1). A virtual machine A21 (10A21) to a virtual machine A25 (10A25) belong to the domain A2 (3A2). A virtual machine B21 (10B21) to a virtual machine B25 (10B25) belong to the domain B2 (3B2).

Net groups 1, 2 and 3 are owned by the customer A. The net group 1 includes the virtual machine A11 (10A11), the virtual machine A12 (10A12), the virtual machine B11 (10B11), the virtual machine A21 (10A21), and the virtual machine B21 (10B21).

The net group 2 includes the virtual machine A13 (10A13), the virtual machine B12 (10B12), the virtual machine B13 (10B13), the virtual machine A22 (10A22), the virtual machine B22 (10B22), and the virtual machine B23 (10B23). The net group 3 includes the virtual machine A14 (10A14), the virtual machine B14 (10B14), the virtual machine A23 (10A23), the virtual machine A24 (10A24), and the virtual machine B24 (10B24).

The net group 4 is owned by the customer B. The net group 4 includes the virtual machine A15 (10A15), the virtual machine B15 (10B15), the virtual machine A25 (10A25), and the virtual machine B25 (10B25).

FIG. 13 depicts a configuration example of the customer management table 40 according to the present embodiment. The customer management table 40 consists of the same columns as Embodiment 1.

FIGS. 14A to 14D depict configuration examples of domain management tables of the domains, respectively. FIG. 14A depicts the configuration example of the domain A1 management table 131 for the domain A1 (10A1). FIG. 14B depicts the configuration example of the domain B1 management table 132 for the domain B1 (10B1). FIG. 14C depicts the configuration example of the domain A2 management table 133 for the domain A2 (10A2). FIG. 14D depicts the configuration example of the domain B2 management table 134 for the domain B2 (10B2).

The domain A1 management table 131 includes columns 311 to 314 and the column configuration is the same as the domain A management table 50 (FIG. 6A) in Embodiment 1. The domain B1 management table 132 includes columns 321, 322 and 323, and the column configuration is the same as the domain B management table 52 (FIG. 6B) in Embodiment 1.

The domain A2 management table 133 includes columns 331 to 324 and the column configuration is the same as the domain A management table 50 (FIG. 6A) in Embodiment 1. The domain B2 management table 134 includes columns 341, 342 and 343, and the column configuration is the same as the domain B management table 52 (FIG. 6B) in Embodiment 1.

The system management unit 21 creates the domain management tables 131 to 134 in the manner descried in Embodiment 1. As described in Embodiment 1, the domain management tables 131 to 134 are set in respective domains.

FIG. 15 depicts a configuration example of a domain connection relation table 140 added in the present embodiment. The management apparatus 2 and the tag conversion apparatuses 1A and 1B each hold the domain connection relation table 140. The domain connection relation table 140 may be created by a user, or the management apparatus 2 may collect information regarding the connected domains from the tag conversion apparatuses 1A and 1B, and create the domain connection relation table 140 from the information.

The domain connection relation table 140 specifies the connection relations between the domain A1 (3A1), the domain A2 (3A2), the domain B1 (3B1), the domain B2 (3B2), the tag conversion apparatus 1A and the tag conversion apparatus 1B. The cells for domains connected with the same tag conversion apparatus specify "Same". The cells for domains connected with different tag conversion apparatuses specify "Different".

For example, the domain A1 (3A1) is connected with the tag conversion apparatus 1A and the domain A2 (3A2) is connected with the tag conversion apparatus 1B. The domain A1 (3A1) and the domain A2 (3A2) are connected via the tag conversion apparatus 1A and the tag conversion apparatus 1B. Thus, the cell for the domain A1 (3A1) and the domain A2 (3A2) shows "Different".

FIG. 16 depicts a configuration example of the tag conversion table 80 according to the present embodiment. The tag conversion table 80 includes a relay tag B identifier column 901 and a relay tag A identifier column 902 in addition to the columns described in Embodiment 1. The relay tag B identifier and the relay tag A identifier are used for the frame transfer between the tag conversion apparatus 1A and the tag conversion apparatus 1B.

The columns 801 to 809 are the same as the columns of the tag conversion table 80 according to Embodiment 1. In FIG. 16, values in the MAC address column 806 and the IP address column 807 are omitted.

Here, it is described how to determine relay tag B identifiers to be stored in the relay tag B identifier column 901. For example, the system management unit 21 allocates different relay tag B identifiers to net groups, respectively. In the example illustrated by FIG. 16, the system management unit 21 allocates the relay tag B identifier "2" to the virtual machines of the net group ID "1". The system management unit 21 allocates the relay tag B identifier "3" to the virtual machines of the net group ID "2". The system management unit 21 allocates a unique value to each net group as the relay tag B identifier.

Next, it is described how to determine relay tag A identifiers to be stored in the relay tag A identifier column 902. The system management unit 21 allocates one relay tag A identifier to one or a plurality of relay tag A identifiers. That is to say, one relay tag A identifier is allocated to one or a plurality of net groups.

In the example illustrated by FIG. 16, the system management unit 21 determines a unique relay tag A identifier for each customer ID. That is to say, different relay tag A identifiers are allocated to the customer IDs, respectively. The relay tag A identifier "1000" is allocated to the customer A and the relay tag A identifier "2000" is allocated to the customer B. In other words, the relay tag A identifier "1000" is allocated to the net groups 1, 2 and 3, and the relay tag A identifier "2000" is allocated to the net group 4.

The tag conversion control unit 26 retains the created tag conversion table 80 in the table storage unit 27. Further, the tag conversion control unit 26 sets the created tag conversion table 80 in the tag conversion apparatus 1A and the tag conversion apparatus 1B.

The operations of the tag conversion apparatuses 1A and 1B are described below. The tag conversion in the frame transfer between the tag conversion apparatuses 1A and 1B is described. As an example, described is a case where the virtual machine A11 (10A11) in the domain A1 (3A1) transmits a frame to the virtual machine B21 (10B21) in the domain B2 (3B2).

The tag conversion apparatus 1A receives a frame from the virtual machine A11 (10A11). The frame has the frame structure 9A. The tag determination unit 124 of the tag conversion apparatus 1A refers to the tag conversion table 80 and determines the source domain and the destination domain of the frame from the values in the source MAC field 92 and the destination MAC field 93.

The tag determination unit 13 refers to the domain connection relation table 140 and determines whether the frame transfer between the source domain and the destination domain passes through a plurality of tag conversion apparatuses. When the frame transfer passes through a plurality of tag conversion apparatuses, the domain connection relation table 140 specifies "Different". In this example, the source domain is the domain A1 (3A1) and the destination domain is the domain B2 (3B2). Thus, the domain connection relation table 140 specifies "Different".

When the frame transfer is between "Different" domains, the tag processing unit 123 of the tag conversion apparatus 1A performs the tag conversion to the tagging scheme A+B. The frame structure of the tagging scheme A+B is the frame structure 9C illustrated in FIG. 3.

The tag processing unit 123 obtains the value of the entry of the destination virtual machine from the relay tag B identifier column 901 and stores the value in the VID field 973 of the VLAN tag 97 of the tagging scheme B. The tag processing unit 123 obtains the value of the entry of the destination virtual machine from the relay tag A identifier column 902 and stores the value in the VNI field 943 of the VXLAN header 94 of the tagging scheme A. In this example, "2" is stored in the VID field 973 and "1000" is stored in the VNI field 943.

The tag processing unit 123 stores the information regarding the destination tag conversion apparatus 1B connected with the destination domain B2 (3B2) in the IP header 952 and the Ethernet header 951 of the VXLAN header 94.

The tag conversion apparatus 1B coverts the frame structure of the received frame from the frame structure of tagging scheme A+B to the frame structure of the tagging scheme B employed in the destination domain. The tag determination unit 122 refers to the tag conversion table 80 and determines the tagging scheme of the domain to which the virtual machine specified by the destination MAC field 93 belongs. In this example, it is the tagging scheme B.

In this example, the tag processing unit 123 of the tag conversion apparatus 1B deletes the VXLAN header 94 and the outer header 95 from the received frame. The tag processing unit 123 refers to the tag conversion table 80 and obtains the value of the entry of the destination virtual machine from the tag B identifier column 808. In this example, the value "11" of the virtual machine B21 (10B21) is obtained. The tag processing unit 123 changes the value in the VID field 973 of the VLAN tag 97 to the obtained value "11". The route determination unit 11 determines an output port and output the frame from the output port in a manner similar to Embodiment 1.

As described above, the tag conversion apparatuses 1A and 1B employ the tagging scheme A+B for the frame transfer between the conversion apparatuses, and add the external A identifier and the external B identifier to the frame. Each of the tag conversion apparatuses 1A and 1B performs the tag conversion described in Embodiment 1 in the transfer of a frame between domains connected with its own ports without transferring the frame to another tag conversion apparatus.

The present embodiment employs a multiple tagging scheme as the relay tagging scheme used in the frame transfer between the tag conversion apparatuses. Thus, the present embodiment allows the flexible allocation of tag identifications to communication apparatuses appropriate to management states of the communication apparatuses.

The present embodiment allocates relay tag B identifiers to individual net groups and relay tag A identifiers to individual customers. The customer A uses a plurality of net groups, and the plurality of relay tag B identifiers are associated with the tag A identifier for the customer A. The configuration to acquire the statistic information on frames transferred between the tag conversion apparatuses and perform the band control for the frames allows a reduction in the necessary resources compared to a configuration to perform them with reference to the relay tag A identifier.

Note that the relay tag A identifier may be defined independently of the customer. For example, only one relay tag A identifier is defined for the entire tag conversion table 80. The relay tag B identifiers may be associated with the relay tag A identifiers in one to one correspondence.

The network system 100 according to the present embodiment does not include the domain C (3C) in Embodiment 1. Alternatively, the network system 100 may be configured to include the domain C (3C). The number of tag conversion apparatuses is not restricted and three or more tag conversion apparatuses may be included in the system.

The tag conversion using the relay tag may be performed within one tag conversion apparatus. The tag conversion apparatus may transmit a frame with a relay tag to itself. The used two relay tagging schemes may be the same tagging scheme and different from the tagging schemes of the source and destination domains. A multiple tagging scheme including three or more types of tags in a frame may be used for the frame transfer between the tag conversion apparatuses.

The present invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that almost of all components are actually interconnected.

What is claimed is:

1. A tag conversion apparatus comprising:
a plurality of ports for communications via networks; and
a controller configured to
hold tag conversion information associating addresses of communication apparatuses and information on tags of tagging schemes for network separation,
analyze a frame input from one of the plurality of ports and determine a current tagging scheme of the frame,
determine a tagging scheme associated with a destination address of the frame based on the tag conversion information,
convert the frame to a frame of the tagging scheme associated with the destination address based on the tag conversion information when the tagging scheme associated with the destination address and the current tagging scheme are different, and
output the converted frame from one of the plurality of ports.

2. The tag conversion apparatus according to claim 1,
wherein the controller is configured to receive a plurality of frames with different tag identifiers of a same or different single tagging schemes,
wherein the controller is configured to convert the plurality of frames to frames of a multiple tagging scheme,
wherein each of the frames of the multiple tagging scheme includes a first type tag identifier and a second type tag identifier,
wherein the frames of the multiple tagging scheme include a common first type tag identifier, and
wherein the controller is configured to output the frames of the multiple tagging scheme from one of the plurality of ports.

3. The tag conversion apparatus according to claim 1,
wherein each of the communication apparatuses belongs to a domain in which frames are transferred by a tagging scheme,
wherein the tag conversion information is configured to associate the addresses with information on tags in tagging schemes of domains to which the addresses belong and information on relay tags in a relay tagging scheme used for frame transfer between tag conversion apparatuses,
wherein the relay tagging scheme is a multiple tagging scheme including a first type tag identifier and a second type tag identifier, and
wherein the controller is configured to convert the frame to a frame of the relay tagging scheme associated with the destination address based on the tag conversion information when the frame is to be transferred to the destination address via another tag conversion apparatus.

4. The tag conversion apparatus according to claim 3, wherein entries of the first type tag identifier is less than entries of the second type tag identifier in the tag conversion information.

5. The tag conversion apparatus according to claim 1,
wherein the tag conversion information contains information on net groups to which the communication apparatuses belong,
wherein each of the net groups consists of one or more communication apparatuses permitted to communicate with each other,
wherein the controller is configured to determine a destination net group to which a communication apparatus of a destination address of a received frame and a source net group to which a source communication apparatus of the received frame based on the tag conversion information, and wherein the controller is configured to discard the received frame when the source net group and the destination net group are different.

6. A system comprising:

the tag conversion apparatus according to claim 1; and a management apparatus configured to manage the tag conversion apparatus, wherein each of the communication apparatuses belongs to a domain in which frames are transferred by a tagging scheme, wherein the management apparatus is configured to hold management information containing address information of the communication apparatuses and domain information of the communication apparatuses, wherein the management apparatus is configured to create the tag conversion information based on the management information, and wherein the tag conversion information contains the address information and tag identifier information of the communication apparatuses.

7. A system comprising:

the tag conversion apparatus according to claim 1; and a management apparatus configured to manage the tag conversion apparatus, wherein the management apparatus is configured to hold the tag conversion information, and management information containing address information of the communication apparatuses and domain information of the communication apparatuses, wherein the management apparatus is configured to update the tag conversion information based on an update of the management information, and wherein the management apparatus is configured to set the updated tag conversion information in the tag conversion apparatus.

8. A method comprising:

analyzing an input frame and determining a current tagging scheme for network separation of the frame;

determining a tagging scheme associated with a destination address of the frame based on tag conversion information associating addresses of communication apparatuses and information on tags of tagging schemes, converting the frame to a frame of the tagging scheme associated with the destination address based on the tag conversion information when the tagging scheme associated with the destination address and the current tagging scheme are different, and outputting the converted frame.

9. The method according to claim 8, further comprising:

receiving a plurality of frames with different tag identifiers of a same or different single tagging schemes; and converting the plurality of frames to frames of a multiple tagging scheme, and outputting the frames of a multiple tagging scheme, wherein each of the frames of the multiple tagging scheme includes a first type tag identifier and a second type tag identifier, and wherein the frames of the multiple tagging scheme include a common first type tag identifier.

10. The method according to claim 8, wherein each of the communication apparatuses belongs to a domain in which frames are transferred by a tagging scheme, wherein the tag conversion information is configured to associate the addresses with information on tags in tagging schemes of domains to which the addresses belong and information on relay tags in a relay tagging scheme used for frame transfer between tag conversion apparatuses, wherein the relay tagging scheme is a multiple tagging scheme including a first type tag identifier and a second type tag identifier, and wherein the method comprising converting the frame to a frame of the relay tagging scheme associated with the destination address based on the tag conversion information when the frame is to be transferred to the destination address via another tag conversion apparatus.

11. The method according to claim 10, wherein entries of the first type tag identifier is less than entries of the second type tag identifier in the tag conversion information.

12. The method according to claim 8, wherein the tag conversion information contains information on net groups to which the communication apparatuses belong, wherein each of the net groups consists of one or more communication apparatuses permitted to communicate with each other, and wherein the method further comprising:

determining a destination net group to which a communication apparatus of a destination address of a received frame and a source net group to which a source communication apparatus of the received frame based on the tag conversion information, and discarding the received frame when the source net group and the destination net group are different.

13. The method according to claim 8, wherein each of the communication apparatuses belongs to a domain in which frames are transferred by a tagging scheme, and wherein the method further comprising:

referring to management information containing address information of the communication apparatuses and domain information of the communication apparatuses; and creating the tag conversion information containing the address information and tag identifier information of the communication apparatuses based on the management information.

14. The method according to claim 8, wherein each of the communication apparatuses belongs to a domain in which frames are transferred by a tagging scheme, and wherein the method further comprising updating the tag conversion information based on an update of the management information containing address information of the communication apparatuses and domain information of the communication apparatuses.

* * * * *